US011337556B2

(12) United States Patent
Eisner

(10) Patent No.: US 11,337,556 B2
(45) Date of Patent: May 24, 2022

(54) LIQUID FOOD ITEM PRESERVATION AND PREPARATION

(71) Applicant: Group B Labs, Inc., Seattle, WA (US)

(72) Inventor: Illi Eisner, Seattle, WA (US)

(73) Assignee: Group B Labs, Inc., Seattle, WA (US)

( * ) Notice: Subject to any disclaimer, the term of this patent is extended or adjusted under 35 U.S.C. 154(b) by 0 days.

(21) Appl. No.: 16/040,523

(22) Filed: Jul. 19, 2018

(65) Prior Publication Data

US 2019/0021548 A1 Jan. 24, 2019

Related U.S. Application Data

(60) Provisional application No. 62/534,641, filed on Jul. 19, 2017.

(51) Int. Cl.
*A47J 43/042* (2006.01)
*A47J 36/24* (2006.01)
(Continued)

(52) U.S. Cl.
CPC ......... *A47J 43/042* (2013.01); *A47J 36/2433* (2013.01); *A47J 43/0465* (2013.01);
(Continued)

(58) Field of Classification Search
CPC .... A47J 43/042; A47J 43/046; A47J 43/0465; A47J 36/2433; A47J 36/2444;
(Continued)

(56) References Cited

U.S. PATENT DOCUMENTS

| 2,950,754 A | 8/1960 | Bertie et al. |
| 3,351,130 A | 12/1967 | Lowe |

(Continued)

FOREIGN PATENT DOCUMENTS

| CN | 103082861 | 5/2013 |
| CN | 204133179 | 2/2015 |

(Continued)

OTHER PUBLICATIONS

International Search Report and Written Opinion for Application No. PCT/US2018/042977; dated Nov. 15, 2018, 17 pages.
(Continued)

*Primary Examiner* — Christopher R Harmon
(74) *Attorney, Agent, or Firm* — McIver IP, PLLC

(57) ABSTRACT

Devices, systems, and apparatuses, and associated methods of preparing a liquid food item for consumption by a liquid food item preparation device are disclosed herein. In one embodiment, a device includes an inner shell having an inner surface and an outer surface, an outer shell having an inner surface and an outer surface, the inner surface of the inner shell defining a liquid holding volume and the outer surface of the inner shell and the inner surface of the outer shell defining a vacuum chamber. The outer shell and inner shell can be configured to form an orifice to the liquid holding volume at their junction. The device can be configured to prepare a liquid food item for consumption, including by powering a heating element and mixer device that can be configured to respectively heat and mix a liquid food item in the liquid holding volume.

22 Claims, 17 Drawing Sheets

(51) Int. Cl.
*A61J 9/02* (2006.01)
*A47J 43/046* (2006.01)
*A61J 11/04* (2006.01)
*A61J 11/00* (2006.01)

(52) U.S. Cl.
CPC .............. *A61J 9/02* (2013.01); *A61J 11/04* (2013.01); *A61J 11/001* (2013.01); *A61J 2200/76* (2013.01); *A61J 2205/60* (2013.01)

(58) Field of Classification Search
CPC .............. A47J 41/0094; A47J 41/0072; A47J 41/0038; A47J 41/02; A61J 9/02; A61J 11/0075; A61J 2200/70; A61J 2200/76; A61J 2205/60
See application file for complete search history.

(56) References Cited

U.S. PATENT DOCUMENTS

| | | | |
|---|---|---|---|
| 3,892,945 A * | 7/1975 | Lerner | A47J 36/2433 219/437 |
| 4,377,737 A | 3/1983 | Berry | |
| 5,294,014 A | 3/1994 | Wyatt | |
| 5,588,557 A * | 12/1996 | Topar | B67D 7/08 222/129.1 |
| 5,692,885 A | 12/1997 | Langer | |
| 6,864,462 B2 | 3/2005 | Sanoner et al. | |
| 7,903,958 B2 | 3/2011 | Tsai | |
| 7,930,937 B2 | 4/2011 | Roques et al. | |
| 8,052,846 B2 | 11/2011 | Holmberg | |
| 8,393,487 B1 | 3/2013 | Pillers | |
| 10,060,650 B2 | 8/2018 | Gaspard | |
| 10,119,724 B2 | 11/2018 | Jonsson | |
| 10,222,091 B2 | 3/2019 | Hankins et al. | |
| 10,442,406 B2 | 10/2019 | Sato | |
| 10,451,292 B2 | 10/2019 | De Los Toyos Lopez et al. | |
| 10,545,108 B2 | 1/2020 | Samarao | |
| 10,561,262 B2 | 2/2020 | Phan et al. | |
| 10,674,865 B2 | 6/2020 | Gamberini et al. | |
| 10,989,421 B2 | 4/2021 | Heil et al. | |
| 2004/0211766 A1 | 10/2004 | Iannucci | |
| 2006/0007781 A1 * | 1/2006 | Martin | A47J 31/401 366/274 |
| 2006/0081599 A1 * | 4/2006 | Anderson | A47J 36/2433 219/438 |
| 2007/0221068 A1 | 9/2007 | Boussemart et al. | |
| 2012/0103562 A1 | 5/2012 | Alexander | |
| 2016/0074057 A1 | 3/2016 | Jezierski | |
| 2016/0122090 A1 | 5/2016 | Cote, Sr. | |
| 2016/0242598 A1 * | 8/2016 | Alexander | A47J 36/2433 |
| 2016/0256839 A1 | 9/2016 | Dickson, Jr. et al. | |
| 2017/0027350 A1 | 2/2017 | Oonza | |
| 2017/0042373 A1 * | 2/2017 | Alexander | A47G 19/02 |
| 2017/0087524 A1 * | 3/2017 | Deshpande | B01F 13/0022 |
| 2017/0138647 A1 | 5/2017 | Zhang | |
| 2017/0340147 A1 * | 11/2017 | Hambrock | A47G 19/2227 |
| 2018/0255966 A1 * | 9/2018 | Moore | A47J 36/2433 |
| 2018/0279832 A1 | 10/2018 | Ohta et al. | |
| 2018/0305091 A1 | 10/2018 | Krafft | |
| 2019/0298615 A1 * | 10/2019 | Wood | A61J 9/00 |
| 2019/0352059 A1 | 11/2019 | Mutch | |

FOREIGN PATENT DOCUMENTS

| | | |
|---|---|---|
| CN | 105700573 | 6/2016 |
| WO | 2017/118379 | 7/2017 |

OTHER PUBLICATIONS

ISA 206—Invitation to Pay Additional Fees for Application No. PCT/US18/42977; dated Sep. 7, 2018, 2 pages.
Office Action dated Feb. 23, 2021, co-pending U.S. Appl. No. 16/834,739, 19 pages.
Notice of Allowance of Sep. 1, 2021; co-pending U.S. Appl. No. 16/674,877; 12 pages.

* cited by examiner

LIQUID FOOD ITEM PRESERVATION AND PREPARATION

CROSS-REFERENCE TO RELATED APPLICATIONS

This application claims priority to and the benefit of U.S. Provisional Patent Application No. 62/534,641, entitled "APPARATUS FOR STORING AND HEATING A LIQUID," filed Jul. 19, 2017, which is incorporated by reference in its entirety.

BACKGROUND

A baby receives essential nutrients from its mother's breast milk. For human mothers, nursing a baby from the breast can be inconvenient or impossible for every instance that a baby desires to be fed. Some mothers preemptively pump their breast milk, which can later be fed to the baby in lieu of nursing directly from the breast.

Like many other food items, pumped breast milk may spoil, reducing its nutrient content, degrading its taste, and ultimately rendering it unfit for consumption. To delay spoilage, breast milk can be frozen or refrigerated. Expressed human breast milk may remain fit for consumption for weeks or months if frozen, and severe spoilage may be delayed for as long as three to five days by refrigeration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A mother's breast milk may be pumped from her breast for later feeding. It is recommended that babies not consume breast milk exposed for more than four hours to room temperatures (e.g., approximately 70 degrees Fahrenheit), which may cause the breast milk to spoil. Breast milk can be preserved for longer periods of time by refrigeration or freezing. For feeding, refrigerated or frozen breast milk is often heated to a consumption temperature, such as body temperature or slightly below (e.g., 98.6 degrees Fahrenheit or lower).

Preparing expressed breast milk for feeding can be problematic and inconvenient for a baby's caregiver. The expressed breast milk often needs heating, but exposing breast milk to high temperatures can degrade nutrients and kill natural bacteria present in the milk, and hot milk can scald a baby's mouth and throat. A popular method for preparing breast milk for consumption includes heating water on a stove, submerging a bottle filled with preserved breast milk in the heated water, swishing the breast milk around in the bottle as the milk slowly heats, and monitoring or routinely sampling a temperature of the breast milk until a consumption temperature is reached. This process of preparation can be tedious, messy, time consuming, and fraught with the risk of dangers involved with overheating the milk or of creating unintended hot spots in the milk.

Several embodiments of the disclosed technology can hold and store a liquid food item, such as human breast milk, at a preservation temperature within a liquid holding volume of a container, and, in response to an instruction to prepare the liquid food item, prepare the liquid food item within the liquid holding volume of the container for consumption, including by heating the liquid food item until a temperature of the liquid food item is at a consumption temperature. Several embodiments of the disclosed technology can comprise a device including thermally insulative walls that define the liquid holding volume, the device configured to store a liquid food item at a preservation temperature, and the device configured to prepare the liquid food item in the liquid holding volume in a controlled and steady manner, minimizing damage to the liquid food item that would result from exposing the liquid food item to excessive temperatures during preparation procedures or from heating the liquid food item in an improper way, such as to heat it beyond a consumption temperature, or from creating potentially harmful hot spots in the liquid food item resulting from uneven heating of the liquid food item.

Several embodiments of the disclosed technology comprise a device including a container comprising an inner surface defining a liquid holding volume of the device and an outer surface, a heating element configured to transfer heat to a liquid within the liquid holding volume, at least one thermal sensor configured to sense a temperature of a liquid within the liquid holding volume, a mixer device comprising a mixing element configured to mix a liquid within the liquid holding volume and a mixer motor for causing the mixing element to rotate or otherwise move in the liquid holding volume, and a processor coupled to a memory, the thermal sensor, and the heating element. The liquid food item preparation device may include a portable power source, such as a battery. The outer surface and inner surface of the container are configured to form, at their junction, an orifice of the liquid holding volume of the liquid food item preparation device, through which a liquid may enter or exit the liquid holding volume from and to outside the container. In some implementations, the device can be configured to comprise a cap sensor coupled to the processor and memory that generates a signal, or otherwise provides an indication of a cap, based at least in part on a presence of the cap at the orifice of the liquid holding volume. In some implementations, the device can be configured to comprise a volume sensor coupled to the processor and memory that generates a signal based at least in part on a volume of a liquid food item within the liquid holding volume.

The instructions stored in the memory can comprise methods for preserving a liquid food item at a preservation temperature and for preparing the liquid food item when an instruction to prepare the liquid food item is received. In some implementations, the instruction to prepare a liquid food item comprises receiving user input comprising an instruction to prepare the liquid food item. In response, the instructions can comprise preparing the liquid food item, wherein preparing the liquid food item comprises powering the mixer device. Powering the mixer device can comprise calculating a mixing signal and applying the mixing signal to the mixer motor of the mixer device, causing the mixing element to spin within the liquid holding volume and stir and/or agitate the liquid stored therein. In some implementations, the mixing element can be configured to comprise a stirrer magnetically coupled to the mixer motor.

The instructions can also include measuring, using the thermal sensor, a temperature in the liquid holding volume and determining whether the temperature is at a consumption temperature. The instructions may further comprise, in response to determining that the temperature is not at the consumption temperature, powering, with the power source, the heating element to transfer heat to the liquid in the liquid holding volume. In some implementations, powering the heating element comprises determining a heating signal for powering the heating element and applying the heating signal to the heating element, wherein the heating signal is determined based at least in part on a measured temperature of the liquid in the liquid holding volume. In some implementations, the heating signal is determined based at least in part on a measured volume of the liquid in the liquid holding volume. The instructions can also comprise periodically or continuously measuring, using the thermal sensor, the temperature of the liquid, determining whether the temperature of the liquid is at the consumption temperature, and, in response to determining that the temperature of the liquid is at the consumption temperature, discontinuing preparation of the liquid, including abstaining from powering the heating element. The instructions can comprise generating an alert and/or an interface for display by a display of the liquid preparation device, indicating that the liquid has been prepared.

In some implementations, the inner surface of the container defining the liquid holding volume of the device is an inner surface of an inner shell, the inner shell including an inner shell outer surface opposite the inner surface of the inner shell; and the outer surface of the container is an outer surface of an outer shell, the outer shell comprising an outer shell inner surface opposite the outer surface of the outer shell, the outer shell being sleeved over the inner shell and defining an insulation compartment between the inner sleeve outer surface and the outer sleeve inner surface. In some implementations, the insulation compartment comprises a vacuum chamber.

In some implementations, the container can further be configured to comprise a button configured on the outer surface of the container, the button coupled to the processor, wherein an instruction to prepare a liquid within the liquid holding volume comprises receiving an indication that the button has been engaged. In some implementations, the container can further be configured to comprise a volume sensor, and the instructions can further comprise determining a volume of the liquid within the liquid holding volume using the volume sensor and calculating a mixing signal for powering the mixer device based at least in part on the determined volume. In some implementations, the heating signal is determined based at least in part on the determined volume. In some implementations, the preparation device can be configured to discontinue liquid food item preparation when a volume of the liquid within the liquid holding volume is not greater than a predetermined minimum volume.

In some implementations, the liquid food item preparation device can further be configured to comprise an orientation sensor, the orientation sensor configured to sense an orientation of the container. The instructions can further comprise determining, using the orientation sensor, an orientation of the device, and discontinuing preparation of the liquid in the liquid holding volume if the orientation is not within an acceptable range of orientations for liquid food item preparation.

In some implementations, the liquid food item preparation device can further be configured to comprise a cap sensor adjacent to the orifice of the liquid holding volume, the cap sensor configured to sense the presence of a cap at the orifice and/or a cap type. The instructions can further comprise determining, using the cap sensor, whether a cap is covering the orifice; and discontinuing preparation of a liquid food item if a predetermined cap is not covering the orifice. The cap can be configured to comprise a cap tag that can be sensed by the cap sensor at close distances. In some implementations, the liquid food item preparation device can be configured to determine that no cap is covering the orifice when no cap tag is sensed. In some implementations, the liquid food item preparation device can be configured to determine that a cap is covering the orifice based at least in part on a cap tag being is sensed. In some implementations, a cap sensor senses a cap tag via a short range wireless communication technology, such as radio-frequency identification (RFID) technology.

In some implementations, a cap is configured to comprise an electrical contact and the cap sensor can comprise an electrical contact, and the electrical contact of the cap sensor can be configured to contact the electrical contact of the cap when the cap is attached and covering the orifice, and the presence of the cap can be determined by a completed circuit with a cap tag that is electrically coupled to the electrical contact of the cap. In some implementations, the liquid food item preparation device can be configured to attach with any of multiple types of caps. Alternative caps comprise, for example, a cap comprising an insulated lid and no orifice, so that the orifice of the liquid holding volume of the device is sealed when the cap is attached to the device.

According to several embodiments of the disclosed technology, the liquid food item preparation device can further be configured to comprise a cap including an artificial nipple covering the orifice of the container. A benefit of the preparation device according to several embodiments is it may maintain a temperature of expressed breast milk in a refrigeration temperature range while not refrigerated itself, and prepare the expressed breast milk in response to receiving an instruction to do so, including by heating the expressed breast milk to a consumption temperature. After determining that the expressed breast milk has reached a consumption temperature, the device may generate an alert and/or indication for display by the display of the liquid food item preparation device associated with the consumption temperature being reached, indicating to a user that the expressed breast milk is prepared.

An infant may feed directly from the container via the cap comprising the artificial nipple. Accordingly, a benefit according to several embodiments is that the container may serve to preserve liquid food items, prepare liquid food items, and serve liquid food items directly to a user without having to transfer the liquid food item to another container. Another benefit according to several embodiments is that the container may preserve a liquid food item that has been prepared to a consumption temperature at or near the consumption temperature for many hours, with or without heating the liquid food item further. According to several embodiments of the disclosed technology, data may be collected related to feeding trends observed with respect to the container. For example, the container may log volume measurements, feeding time, feeding duration, and so forth. According to several embodiments of the disclosed technology, a liquid food item preparation device containing a liquid food item is configured to prepare expressed human breast milk, including by heating the breast milk to a consumption temperature, in an automated fashion in response to a button being pressed on the device. According to several embodiments of the disclosed technology, a liquid food item preparation device containing a liquid food item is configured to prepare pre-mixed formula, including by heating the pre-mixed formula to a consumption temperature, in an automated fashion at a preparation time. According to several embodiments of the disclosed technology, a liquid food item preparation device containing a liquid food item is configured to prepare powdered formula, including by mixing the powdered formula with room-temperature water and heating the mixture to a consumption temperature, in an automated fashion at a preparation time.

DETAILED DESCRIPTION

Figure 1:
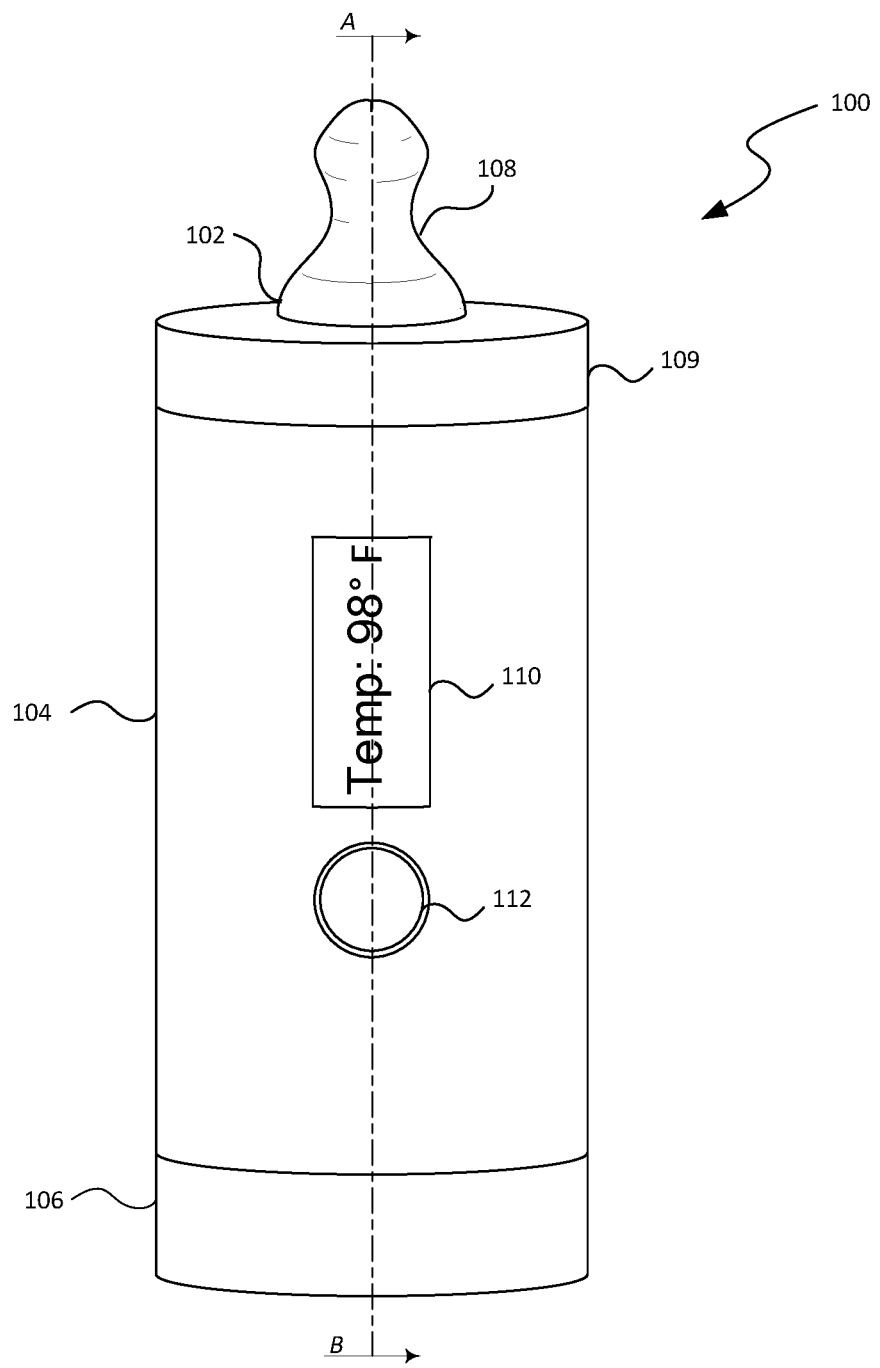
FIG. 1 is a schematic perspective view of a liquid food item preparation device for preserving a liquid food item and preparing it for consumption in accordance with embodiments of the disclosed technology.

Certain embodiments of apparatuses, systems, devices, components, modules, routines, data structures, and processes for preserving a liquid food item and preparing it for consumption are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-12.

As used herein, the term "preservation temperature" generally refers to a temperature or temperature range at and/or below which a food item can be stored for extending a consumption life of the food item. As used herein, the term "consumption life" generally refers to a period of existence for a food item in which the food item is considered fit for consumption for its intended purposes or use. Consumption life may vary among different liquid food items, preservation temperatures, and standards for what is considered fit for consumption for a purpose or use. For example, a preservation temperature of 32 degrees Fahrenheit or lower for expressed human breast milk may enable a consumption life, in which it will not cause sickness to a baby if consumed, of many weeks or months after it has been expressed from a mother, and a preservation temperature between 32 and 37 degrees Fahrenheit may enable a consumption life of three to five days after it has been expressed from the mother.

As used herein, the term "consumption temperature" generally refers to a temperature to which a liquid food item is heated during preparation. A consumption temperature may comprise a temperature defined by a user. A consumption temperature may comprise a predetermined temperature setting. For example, a setting associated with preparing human breast milk may include a consumption temperature approximately equivalent to or lower than body temperature (i.e., 98.6 degrees Fahrenheit).

As used herein, the term "preparation time" generally refers to a time that a liquid food item being preserved by a liquid food item preparation device is to be prepared for consumption. In some implementations, a preparation time may comprise a predetermined time that a liquid food item is to be prepared at. For example, a preparation time may comprise a time received as input from a user, such as a particular time during the day (e.g., 3:30 a.m.). A preparation time can also refer to the occurrence of receiving an instruction to prepare a liquid food item, such as user input instructing that the liquid food item be prepared.

As used herein, a "liquid food item" generally refers to a substance that has a liquid consistency that can be both stirred and heated and that is consumable by humans or animals. Human breast milk is an example of a liquid food item. The technology disclosed herein can be used for preserving and preparing other liquids including other liquid food items, including baby formula, dairy milk, soup, tea, coffee, purees, and the like. As such, although the term "liquid food item" and the more specific example of expressed breast milk are discussed herein, it is to be understood that liquid food item preparation device, according to embodiments of the technology, can be configured to prepare various types of liquid, and, thus, "liquid" and "liquid food item" are used interchangeably herein. As used herein, "preparing" a liquid food item generally refers to a process that includes heating the liquid food item. Preparing a liquid food item can also include stirring the liquid food item and/or measuring a temperature of the liquid food item, and/or measuring the volume of the liquid food item, and/or measuring an orientation of the preparation device, and other processes and steps.

FIG. 1 is a schematic perspective view of a liquid food item preparation device 100 for preserving a liquid food item and preparing the liquid food item for consumption, in accordance with embodiments of the disclosed technology. As shown in FIG. 1, the device 100 can be configured to comprise a cap member 102, a body member 104, and a battery member 106. The cap member 102, body member 104, and battery member 106 can be configured to releasably attach with one another, and they are shown attached in FIG. 1. As shown in FIG. 1, the device 100 can be configured to have a cylindrical shape.

The device 100 can be configured to store, in a liquid holding volume within the body member 104, a liquid food item, preserve the liquid food item at a preservation temperature, and prepare the liquid food item at a preparation time. The device 100 can be configured to include, on the body member 104, a display 110 and a button 112. The display 110 can be electrically and communicatively coupled with a processor configured within casing of the body member 104. The display 110 can be configured to display, for example, information related to a liquid food item being stored and/or prepared by the device 100. For example, as shown in FIG. 1, the display can show a temperature of a liquid food item, as determined by the device. The button 112 can be configured to generate a signal, which can be received by the processor, indicating that the button 112 has been engaged. In some implementations, the device 100 is configured to prepare a liquid food item for consumption upon detecting engagement of the button 112 by a user. In some implementations, the device 100 includes additional or other user interface elements, including a touchscreen interface or a keyboard interface.

In some implementations, the device 100 is configured to generate data that can be transferred wirelessly (e.g., via Bluetooth) to another device for generating a graphical user interface by the other device, and the device 100 can be configured to receive input data (e.g., touch input data) received by the other device with respect to the interface. For example, a smartphone can generate a graphical user interface based at least in part on data generated by the device 100, and data representing user input with respect to the interface can be received from the smartphone.

The cap member 102 can comprise a cap base 109 and a synthetic nipple 108 configured thereon. The cap base 109 can be configured to cover an orifice to the liquid holding volume, except for a hole (not shown) in the cap base approximately concentric to the cylinder shape of the body member 104, the hole concentric with the synthetic nipple 108, through which a liquid food item stored in the liquid holding volume of the body member 104 may pass on its way to exiting the device 100 via a hole in the synthetic nipple 108, such as when a baby drinks from the device 100 after a liquid food item has been prepared. In some implementations, a cap member can be configured to include a nipple adapter plate (not shown) configured between the cap base 109 and the synthetic nipple 108. The nipple adapter plate can be configured to attach the synthetic nipple 108 with the cap base 109. Accordingly, the nipple adapter plate may enable the cap member 102 to accommodate nipples of different diameters at their base. The battery member 106 can comprise a battery for powering the device 100.

Figure 2:
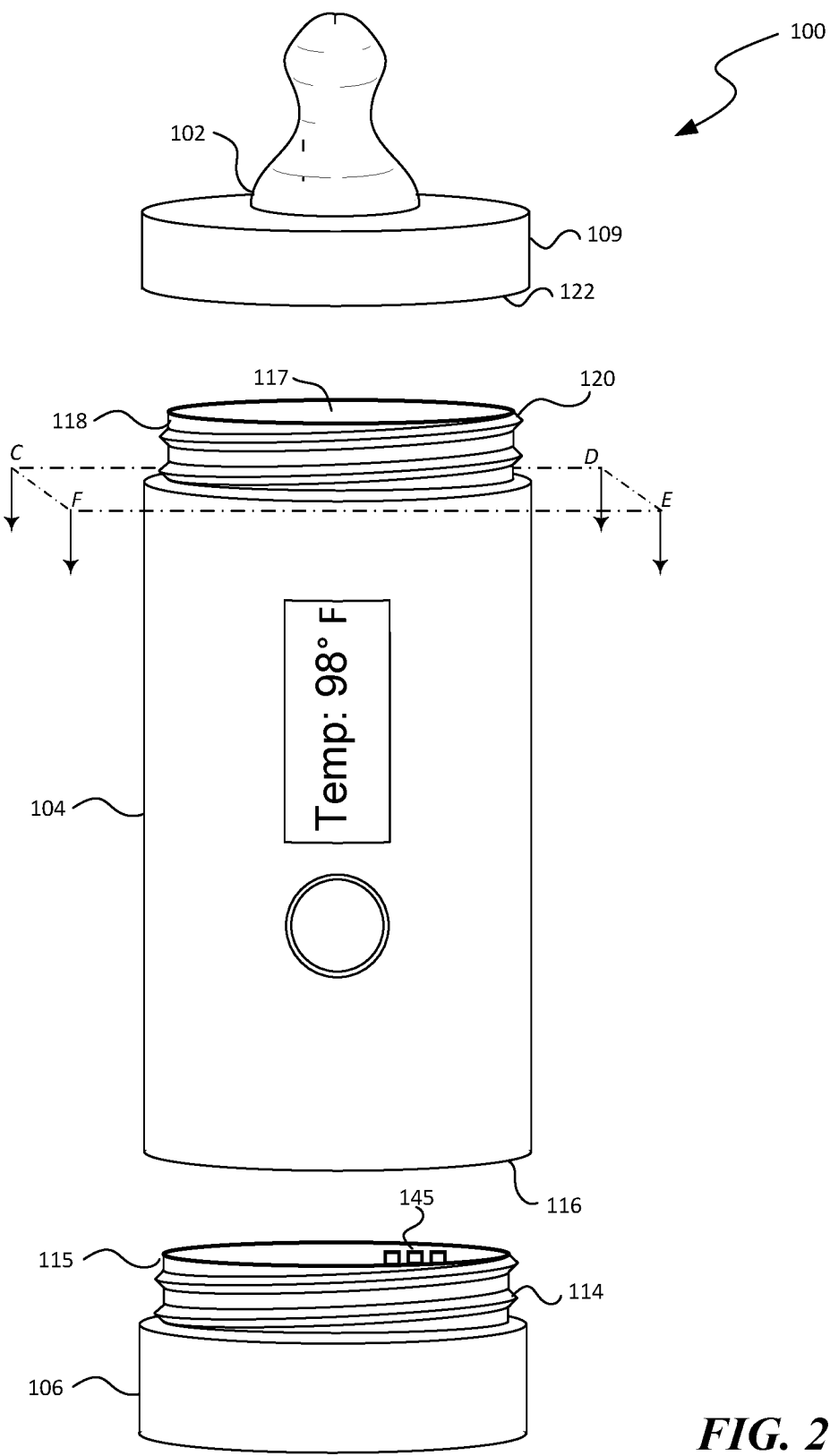
FIG. 2 is a schematic perspective exploded view of the liquid food item preparation device for preserving a liquid food item and preparing it for consumption, in accordance with embodiments of the disclosed technology.

FIG. 2 is a schematic perspective exploded view of the device 100 showing the cap member 102, the body member 104, and the battery member 106 detached from one another. The body member 104 comprises a container and includes an orifice 117 to a liquid holding volume of the body member 104. The orifice 117 is formed at a junction of an inner surface of the container of the body member 104 and an outer surface of the body member 104. The body member 104 includes a screw neck 118, which can be configured around the circumference of the orifice 117. The screw neck 118 can be configured to comprise male screwing threads 120. At a connector end 122 of the cap base 109, the cap member 102 can be configured to comprise corresponding female screwing threads (not shown). Accordingly, the cap member 102 can be configured to be screwed on the screw neck 118 of the body member 104 thereby attaching to the body member 104. The cap member 102 can be configured to cover the orifice 117 when attached to the body member 104 at the screw neck.

Similarly, the battery member 106 can be configured to include a battery screw neck 115 including male screwing threads 114, and at a base 116 of the body member 104, the body member 104 can be configured to include corresponding female screwing threads (not shown). In some embodiments, the container can be configured to comprise an internal battery member rather than a detachable battery member. The battery member 106 can be configured to include a battery connector 145, which can be configured to electrically connect the battery of the battery member 106 with components of the body member 104 when the battery member 106 is screwed in, attached to the body member 104.

Figure 3:
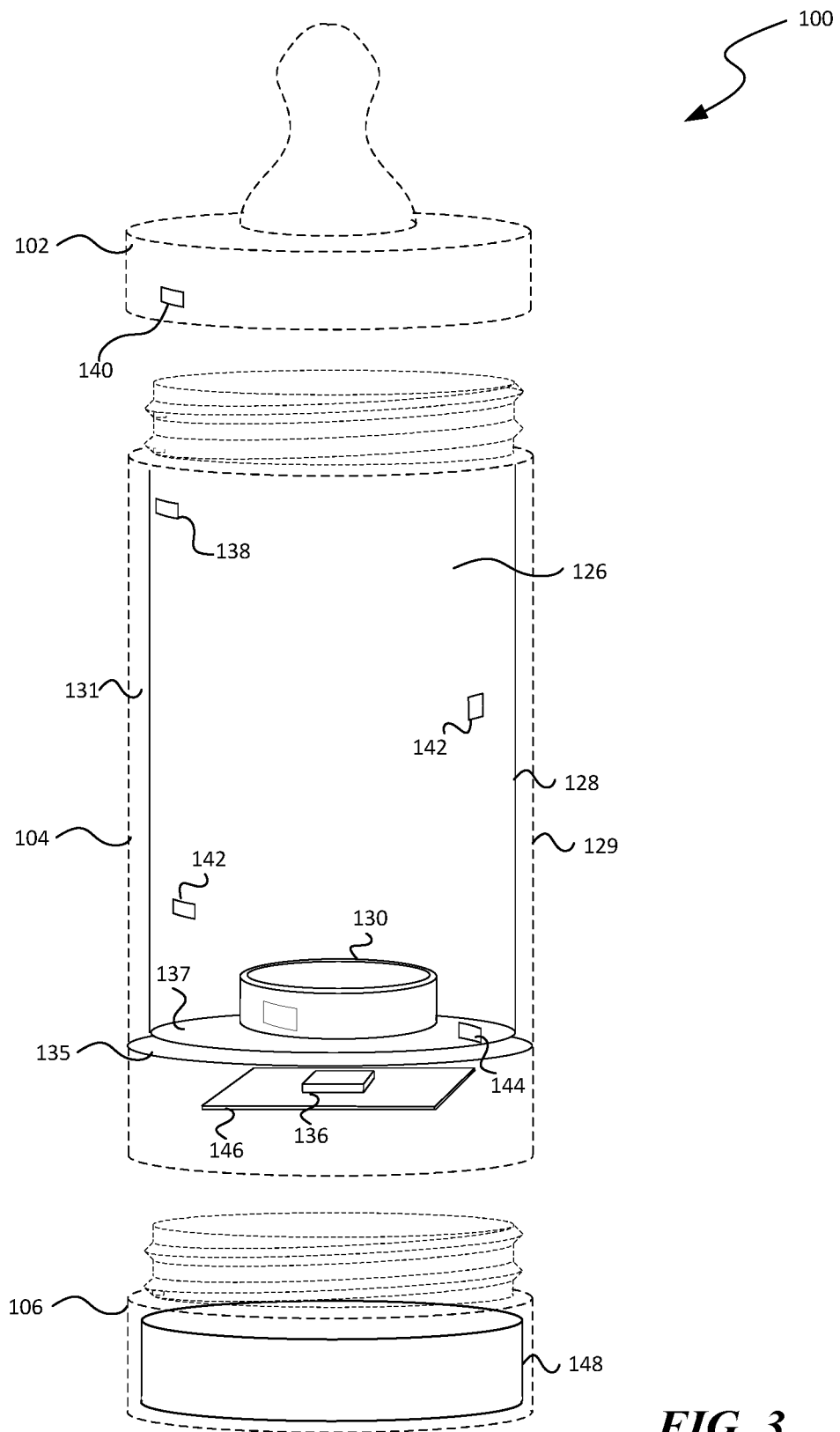
FIG. 3 is a schematic perspective exploded view diagram showing components of the liquid food item preparation device in accordance with embodiments of the disclosed technology.

FIG. 3 is a schematic perspective diagram showing components of the liquid food item preparation device 100. The components shown in FIG. 3 are configured within the external surfaces of the cap member 102, body member 104, or battery member 106, as shown. For clarity, internal features and components of the device 100 are represented in solid lines while features and components observable in a perspective view of the device 100, like that shown in FIGS. 1 and 2, are represented in dashed lines.

The body member 104 is configured to comprise a liquid holding volume 126 defined by an inner surface of an inner shell 128 of the body member 104. The body member 104 can be configured to comprise an outer shell 129 sleeved over the inner shell 128 and spaced apart from the inner shell by a distance, forming, between an outer surface of the inner shell 128 and an inner surface of the outer shell 129, a volume defining an insulation compartment. The body member 104 includes an insulation compartment comprising a vacuum chamber 131. During manufacturing of the body member 104, a vacuum can be created in the vacuum chamber 131. The vacuum chamber 131 (along with the cap member 102) can be configured to thermally insulate the liquid holding volume 126 from the atmosphere outside the device 100. In some implementations, the body member 104 can be configured to include other or additional insulation than the vacuum chamber 131. For example, in some implementations, a thermally insulative material, such as aerogel, polyurethane, polyethylene foam, and/or air may be deposited in the vacuum chamber 131 rather than a vacuum being created.

The body member 104 can be configured to comprise a heating element 130 configured to transfer heat to a liquid food item contained in the liquid holding volume 126. The body member 104 can be configured including the heating element 130 configured on the inner surface of the inner shell 128 at a floor 137 of the inner shell. The body member 104 can also be configured to include a mixer device, which includes a mixing element (not shown) arranged within the liquid holding volume 126 and a mixer motor 136 arranged below an outer shell base 135 whose inner surface helps define the vacuum chamber 131. The mixer motor 136 can be configured to cause the mixing element to spin within the liquid holding volume 126, thereby mixing a liquid food item contained therein. For example, as described further herein, the mixing element can be configured of a magnetically charged material, such as neodymium, and the mixer motor 136 can comprise a mixing plate comprising multiple magnets arranged in a circle and arranged so polarities alternate around the circle. The mixing plate can magnetically couple to the mixing element and cause the mixing element to spin when the mixing plate is spun by the mixer motor.

The body member 104 can also be configured to include a cap sensor 138. The cap sensor 138 can be configured, for example, on an outer surface of the inner shell 128. The cap member 102 can be configured to include a cap tag 140. The cap tag 140 can be configured, for example, embedded in the cap base of the cap member 102. In some implementations, the cap sensor 138 can be configured to sense the presence of the cap tag 140 and/or identifying information from the cap tag 140. In some embodiments, the cap sensor 138 comprises an electrical contact and the cap tag 140 comprises an electrical contact, and the electrical contact of the cap sensor 138 is configured to physically and electrically contact the corresponding electrical contact of the cap tag, completing a circuit with the cap tag 140 when the cap member 102 and body member 104 are attached, enabling the cap sensor 138 to receive data from the cap tag 140, such as an identifier for the cap member 102.

The body member 104 can also be configured to include at least one thermal sensor 142. The thermal sensor 142 can be configured on the outer surface of the internal shell 128. In some implementations, the body member 104 includes multiple thermal sensors 142 located at various locations. For example, as shown in FIG. 3, the thermal sensors 142 are configured at opposite sides of the body member 104 and at varying distances from the heating element 130.

The body member 104 can also be configured to include a volume sensor 144. The volume sensor 144 can be configured on the outer surface of the inner shell 128. As shown in FIG. 2, the volume sensor 144 can be configured on the outer surface of the inner shell 128, for example, at the floor 137 of the inner shell. In some implementations, the volume sensor 144 can be configured on the outer surface of the inner shell elsewhere on the inner shell 128 or on the inner surface of the inner shell 128.

The body member 104 can also be configured to include a circuit board 146 comprising a processor and a memory. The circuit board 146 can also include other components, including an accelerometer, an orientation sensor, a communications device (e.g., Bluetooth receiver), real-time clock, temperature sensor, and the like. The processor can be configured to be electrically and/or communicatively coupled to the heating element 130, mixer device (i.e., mixer motor 136), cap sensor 138, thermal sensor 142, and volume sensor 144, and also to the display 110 and button 112 (FIG. 1). The battery member 106 can be configured to include a battery 148. The body member 104 and battery member 106 can be configured to electrically connect the battery 148 and the components of the body member 104, including the processor and memory, when the battery member 106 is attached to the body member.

In some implementations, the battery member 106 can be configured to include a battery management unit configured to regulate and balance charging and discharging of the battery 148. The battery management unit may comprise a circuit board configured to regulate charging and discharging via the battery terminals 145.

Figure 4:
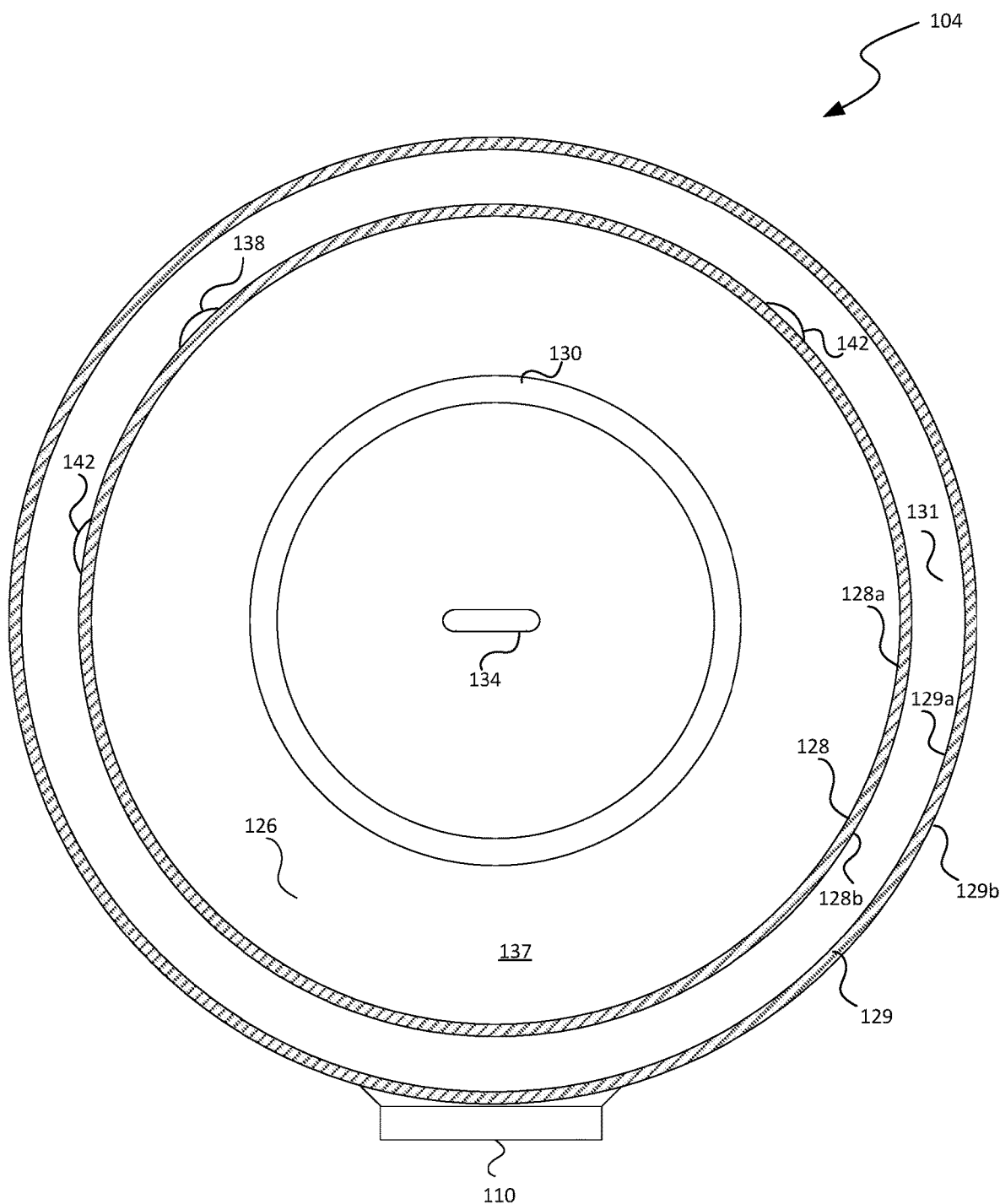
FIG. 4 is a schematic cross-sectional top view of a body member of the liquid food item preparation device in accordance with embodiments of the disclosed technology.

FIG. 4 is a schematic cross-sectional top view of the body member 104 of the liquid food item preparation device 100 taken at a plane CDEF as shown in FIG. 2. As shown in FIG. 4, the body member 104 can be configured to include the outer shell 129 configured outside the inner shell 128 relative to the liquid holding volume 126. The inner shell 128 and outer shell 129 can be configured to be cylindrical and concentric with one another. The outer shell 129 can be configured having a greater radius than the inner shell 128, and the vacuum chamber 131 can be created in the volume between an outer surface 128b of the inner shell 128 and an inner surface 129a of the outer shell 129. An inner surface 128a of the inner shell 128 can define the liquid holding volume 126. An outer surface 129b of the outer shell 129 is opposite the inner surface 129a of the outer shell 129. The outer surface 129b of the outer shell 129 can be configured to comprise the outer surface of at least part of the body member 104.

The heating element 130 can be configured on the inner surface 128a of the inner shell 128 on the floor 137 of the inner shell. The heating element 130 can be configured to have a generally cylindrical shape and thus appears round in the section in FIG. 4. The heating element 130 can be disposed so that it is concentric with the inner shell 128. The body member 104 can also be configured to include the mixing element 134 disposed on the inner surface 128a of the inner shell 128 on the floor 137 of the inner shell. The mixing element 134 can be configured to be disposed at a location that is generally concentric with the heating element 130. As discussed herein, the mixing element 134 can be coupled to a motor, and when the motor is engaged, the mixing element 134 can be caused to rotate. In some implementations, the mixing element is configured to have a cylindrical pill shape.

The body member 104 can be configured to comprise, on the outer surface 129b of the outer shell 129, the display 110 and button (not shown). The body member 104 can be configured to include, on the outer surface 128b of the inner shell 128, thermal sensors 142. In some implementations, the thermal sensors 142 can be configured in contact with the liquid holding volume. For example, in some embodiments, the thermal sensors 142 can be configured within the liquid holding volume. In some embodiments, the thermal sensors 142 can be configured on the inner surface 128a of the inner shell 128.

The body member 104 can also be configured to comprise the cap sensor 138. In FIG. 4, the cap sensor 138 is configured on the outer surface of the inner shell 128. In some implementations, the cap sensor 138 can be configured on the inner surface 129a of the outer shell 129, or on the inner surface 129a of the inner shell 129. In some embodiments, the cap sensor 138 comprises an electrical contact on the outer surface of the outer shell 129 at the orifice of the body member 104 configured so that it may contact an electrical contact of a cap tag.

Figure 5A:
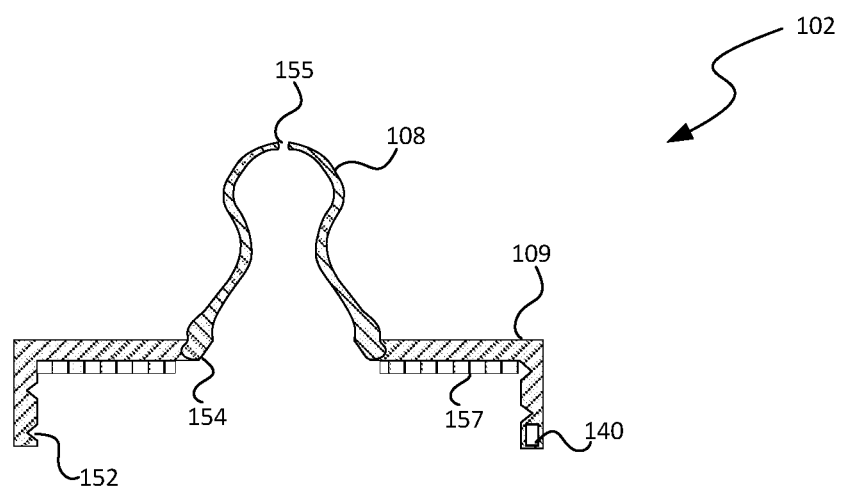
FIGS. 5A-C are schematic cross-sectional side views of a cap member, the body member, and a battery member of the liquid food item preparation system in accordance with embodiments of the disclosed technology.
Figure 5B:
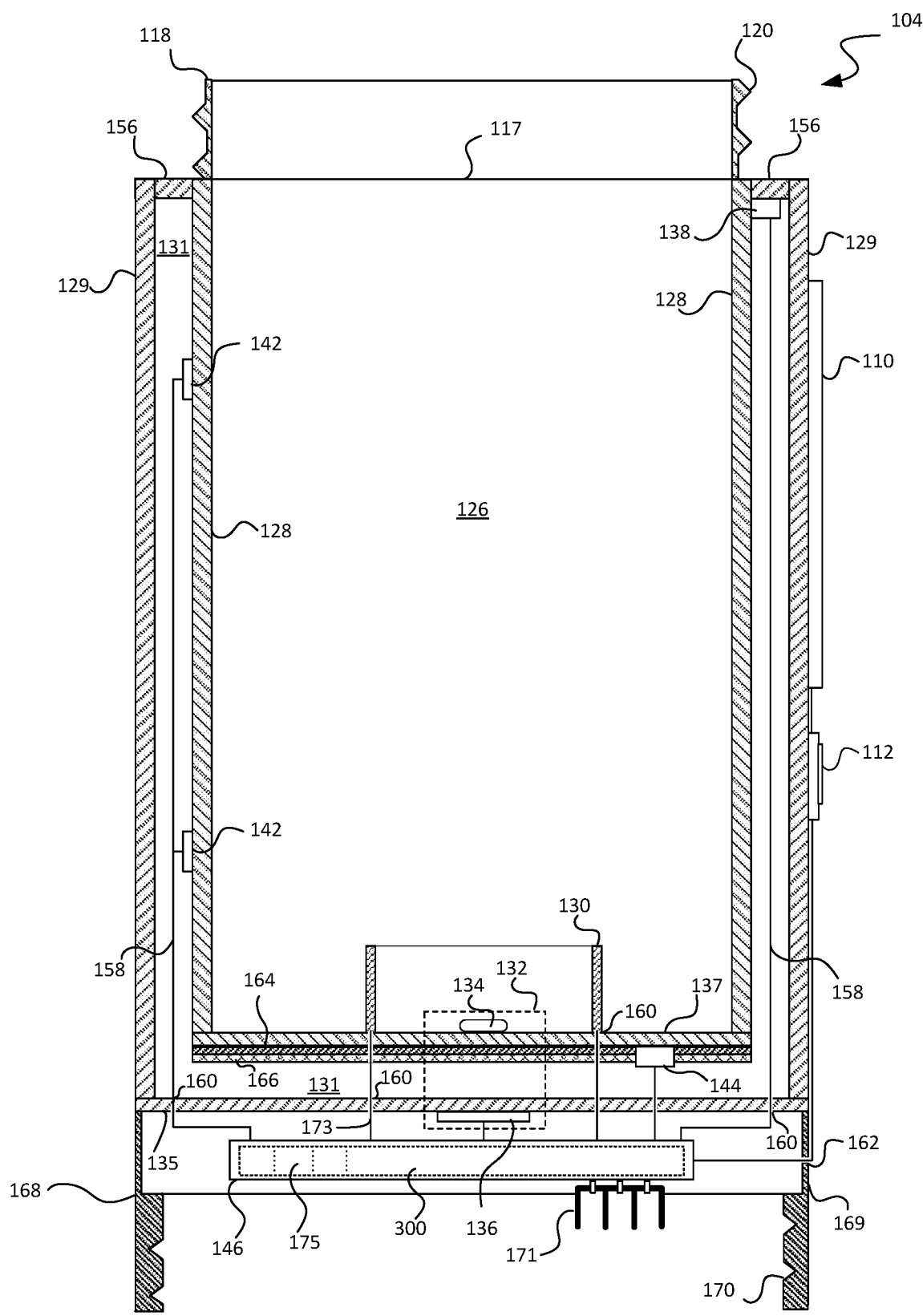
Figure 5C:
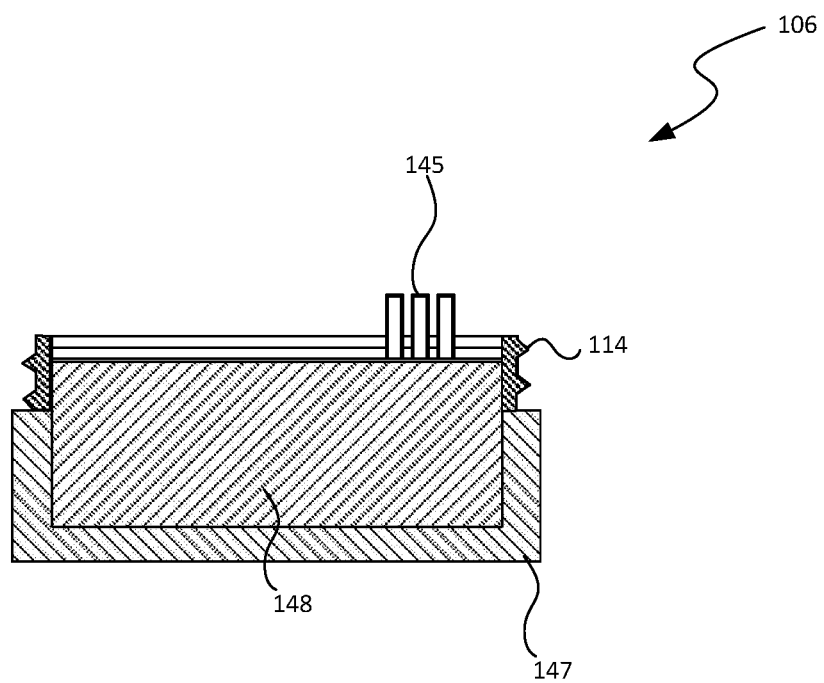

FIGS. 5A-C show a schematic diagram of a cross-sectional side view, taken along line AB shown in FIG. 1, of the cap member 102, body member 104, and battery member 106 of the device 100, showing components of the device 100 for preserving and preparing a liquid food item. Components of the device 100 are illustrated for purposes of clarity in this disclosure in the two-dimensional plane of the cross-section shown in FIGS. 5A-C, while in implementation these components may be located in different two-dimensional planes relative to one another. For example, as shown in FIG. 4, the cap sensor 138 and thermal sensors 142 can be configured on the outer surface 128b of the inner shell 128 at various locations in the horizontal plane CDEF, whereas the cap sensor 138 and thermal sensor 142 are depicted in the schematic diagram of FIGS. 5A-C as both being in the vertical plan AB for purposes of clarity and disclosure.

As shown in FIG. 5A, the cap member 102 can be configured to include the synthetic nipple 108 attached to the cap base 109. In some implementations, the synthetic nipple 108 is attached to a cap adapter (not shown) which is attached to the cap base 109. For example, a cap adapter may comprise a ring of plastic that snaps into the cap base 109 at the perimeter of the hole in the cap base 109. The synthetic nipple 106 can snap into the cap adapter. The cap base 109 can be constructed using a rigid, food-safe material, such as stainless steel or polyethylene plastic, and it can be created using a standard molding process including vacuum molding or injection molding, depending on the material used. The cap base 109 can be configured to include a cap hole 154 configured to pass a liquid food item from the liquid holding volume of the body member 104 to expel the liquid food item from the device 100 via the synthetic nipple 108.

The synthetic nipple 108 can be configured to comprise a nipple hole 155, which can comprise an orifice to the liquid holding volume of the body member 104 when the cap member 102 comprising the synthetic nipple 108 is attached to the body member 104. In some embodiments, the nipple hole 155 is generally cylindrical and has a radius conducive to passing a liquid food item when suction is applied on the synthetic nipple 108 from outside the device 100. Nipple holes for cap members for different purposes or liquid flow rates can have different radiuses. For example, a radius of a nipple hole of a cap member for consuming soup can be greater than a radius of a nipple hole of a cap member for consuming breast milk.

The synthetic nipple 108 can be constructed using standard synthetic nipple materials used for conventional baby bottles, such as silicone, and attached to the cap base by, for example, contact friction, suction, self-amalgamation, glue or thermal bonding. In some embodiments, a thermal insulation layer 157 can be configured on a surface of the cap base 109, as shown in FIG. 5A. In some implementations, the thermal insulation layer 157 can be configured to comprise a vacuum chamber. In some implementations, the insulation layer 157 can be configured to comprise a thermally insulative layer of material, such as polystyrene, plastic, or silicone. In some implementations, the insulation layer 157 comprises a washer layer configured to seal the cap base 109 and the screw neck 118 of the body member 104 when the cap member 102 and body member 104 are attached to one another, such that a liquid food item stored in the liquid holding volume 126 of the body member 104 does not leak out the device 100 via a gap between the under surface of the cap base and the screw neck 118 of the body member 104. In some embodiments, the cap base 109 is configured to include additional or other layers of material or other components. For example, the cap base 109 can comprise a sealant/washer layer in addition to the insulation layer 157. The cap base 109 can be configured to include female screwing threads 152 that are complementary to the male screwing threads 120 of the screw neck 118 of the body member 104, for releasably attaching the cap member 102 with the body member 104.

The cap base 109 can also be configured to include the cap tag 140. The cap tag 140 can be attached to the cap base 109 in various ways, including by embedding the cap tag 140 inside the cap base 109, such as by cutting or molding a compartment for the cap tag in the cap base and sealing the cap tag within the compartment. In some embodiments, the cap tag 140 is configured on a surface of the cap base 109, such as by gluing the cap tag 140 to the cap base 109. In some embodiments, the cap tag 140 can comprise an electronic identification tag, such as an RFID tag. In some embodiments, the cap tag 140 can comprise an optically identifiable pattern such as a barcode or dot sequence that is optically identified by an optical sensor on the outer surface of the junction 156. The cap tag 140 can be configured to provide identifying information for the cap member 104, such as by a unique identifier and/or a code corresponding to a cap type. In some implementations, the cap tag 140 comprises an electrical contact that is configured to contact a corresponding electrical contact configured on the body member 104 when the cap member 102 and body member 104 are attached, for transmitting information related to the cap member 102, such as identifying information and placement information (e.g., that the cap member 102 has been attached to the body member 104).

Figure 11A:
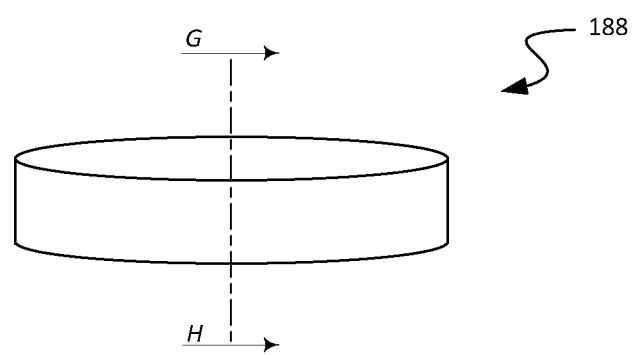
FIGS. 11A-B are schematic diagrams of an alternative embodiment of a cap member in accordance with embodiments of the disclosed technology.
Figure 11B:
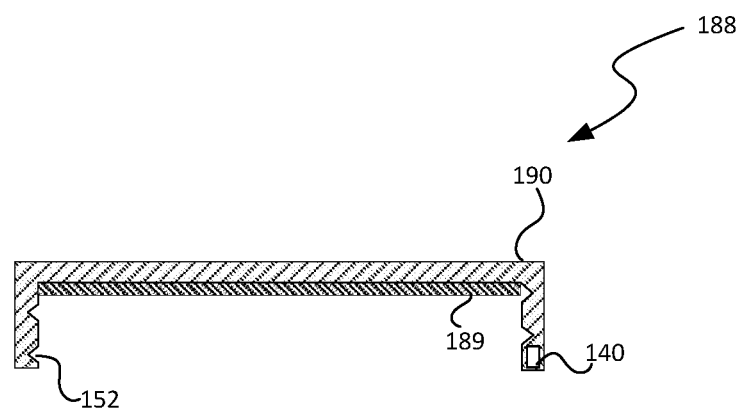

Various embodiments of cap members configurable to releasably attach to the body member 104 are disclosed herein. The cap member 102 shown in FIG. 5A is configured to facilitate the consumption of a liquid food item contained in the liquid holding volume 126 of the body member 104 via the synthetic nipple 108 when attached at the orifice of the body member 104. Other embodiments for cap members can include features similar to those of the cap member 102, including, for example, a cap base, insulation layer, and female screwing threads. In some embodiments, a cap member comprises an insulated storage cap. For example, an insulation layer may be constructed under a cap base of an insulated cap and the cap base can be configured without a hole like the hole 154 shown in FIG. 5A with respect to the depicted cap member 109. An example embodiment is shown in FIGS. 11A-B. In some embodiments a cap member includes interchangeable nipples. In some embodiments, a cap member includes a spill-proof spout cap. In some embodiments a cap member includes an integrated straw cap. In some embodiments a cap member includes a soft edge open top cap.

FIG. 5B shows the body member 104 according to some embodiments of the technology. The body member 104 can be configured to include the inner shell 128 configured within the outer shell 129 and separated by a vacuum chamber 131. The outer shell 129 can be configured sleeved over the inner shell 128, and the inner shell 128 and outer shell 129 can be configured to meet at a junction 156, forming the orifice 117 to the liquid holding volume 126. The body member 104 can also be configured to comprise the screw neck 118 that extends from the junction 156 around the circumference of the orifice 117. The screw neck 118 can be configured to comprise the male screwing threads 120.

The inner shell 128 can be constructed of any of various suitable materials including, for example, stainless steel, glass, or Teflon coated aluminum. The outer shell 129 can be constructed of any of various suitable materials including, for example, stainless steel, Teflon coated aluminum, and/or silicone coated aluminum. The inner shell 128 and outer shell 129 can be manufactured separately and welded together. For example, the inner shell 128 and the outer shell 129 can each be formed out of stainless steel using conventional molding techniques. Components of the body member 104, such as the thermal sensors 142, cap sensor 138, and volume sensor 144, can be glued or otherwise affixed to the outer surface of the inner shell 128, as shown in FIG. 5B, or elsewhere, as described, prior to the inner and outer shells being welded together. A vacuum can be induced in the vacuum chamber 131 using, for example, a compressor.

A way of manufacturing the body member 104 can comprise the following. The outer shell 129 can be formed from stainless steel sheet-metal that is stamped to size, rolled into a tube, and welded along the seam. The Inner shell 128 can be formed from stainless steel sheet-metal that is stamped to size, rolled into a tube, and welded along the seam. The height and diameter of inner shell 128 can be configured smaller than the diameter of outer shell 129 such that when outer shell 129 is sleeved over inner shell 128, a gap where the vacuum chamber 131 will be is formed between the outer surface of the inner shell 128 and the inner surface of the outer shell 129. The inner shell floor 137 can be formed from stainless steel sheet-metal that is stamped to the diameter of inner shell 128. The Inner shell floor 137 can be simultaneously stamped for holes 160 through which the heating element connectors 173 and component connectors 158 can be routed.

The heating element 130 can be placed down onto the inner surface of inner shell floor 137, such that heating element connectors 173 protrude from the holes 160 on the outer surface of inner shell floor 137. The stainless steel surface of heating element 130 can be welded to the stainless steel inner surface of the inner shell floor 137. The heating element connectors 173 can be secured within the holes 160 using glue or epoxy, such as vacuum epoxy and the glue or epoxy is cured using standard techniques. Vacuum epoxy may comprise a mixture of a resin and hardener, such as bisphenol-A-(Epichlorhydrin) and iminodiethylamine, quartz (SiO2), or bisphenol A.

The floor 137 of the inner shell 128 can be welded along the circular junction of inner shell 128 and floor 137. Component connectors 158, configured to comprise, for example, thin wires or flex cables, can be sleeved in a relatively low off-gassing electrically-insulating material such as polyetheretherketone (PEEK), fiberglass, or polystyrene, and can be cut to a length sufficient for connecting each component to the circuit board 146. Component connectors 158 can be connected to components of the body member 104.

Components of the body member 104, such as the thermal sensors 142, cap sensor 138, and volume sensor 144, can be adhered or otherwise affixed to the outer surface of the inner shell 128, as shown in FIG. 5B, using a glue or epoxy, such as vacuum epoxy, and the glue or epoxy can be cured using standard techniques.

Components of the body member 104, such as the display 110 and button 112, can be adhered or otherwise affixed to the outer surface of the outer shell 129, as shown in FIG. 5B, using a glue or epoxy, such as vacuum epoxy, and the glue or epoxy is cured using standard curing techniques.

Component connectors 158 of the body member 104, can be configured to run from the components affixed to the outer surface of the inner shell 128, including the thermal sensors 142, cap sensor 138, and volume sensor 144 temporarily aggregated at the outer surface of floor 137.

Component connectors 158 of the body member 104 can be run from the components affixed to the outer surface of the outer shell 129, including to the display 110 and button 112 and temporarily aggregated at the outer surface of floor 137.

As shown in FIG. 5B, the circuit board 146 can be configured outside the vacuum chamber 131. According to the following process, the circuit board 146 can be configured outside the vacuum chamber 131.

The outer shell base 135 can be formed from stainless steel sheet-metal that is stamped to the diameter of outer shell 129. The outer shell base 135 can be simultaneously stamped for holes required for vacuum extraction and for routing leads through shell base 135 to the circuit board 146. The component connectors 158 and the heating element connectors 173 can be routed through holes 160 on the outer shell base 135. The component connectors 158 and the heating element connectors 173 can be secured and sealed within holes 160 on the outer shell base 135 using vacuum epoxy, which can be cured using standard techniques.

The outer shell base 135 can be welded along the circular junction of the outer shell 129 and the outer shell base 135. A vacuum can be created in the vacuum chamber 131 by connecting a specialized compressor and spot-welder, metal inert gas (MIG) welder, tungsten inert gas (TIG) welder, or arc welder to the vacuum hole on the outer shell base 135 that sequentially and seamlessly creates a vacuum in vacuum chamber 131, and the vacuum chamber 131 can be welded shut by welding the hole on the outer shell base 135 through which air was extracted.

All surface mounted components, including power socket 171 and mixer motor device 136, can be connected and/or surface-mounted to circuit board 146. Plastic or stainless steel standoffs can be adhered to reserved "blank" spaces on the circuit board 146 using glue or epoxy. Component connectors 158 can be connected to circuit board 146. The circuit board 146 can be adhered to the outer surface of outer shell base 135 via standoffs (not pictured) using glue or epoxy and cured using standard methods. In some embodiments, standoffs are created as part of the outer shell base 137 during the creation (e.g. stamping) of the outer shell base 137 and the circuit board 146 can be created with predrilled holes aligned to standoffs of the outer shell base 137 such that the circuit board 146 can snap onto the standoffs of the outer shell base 137.

Figure 8:
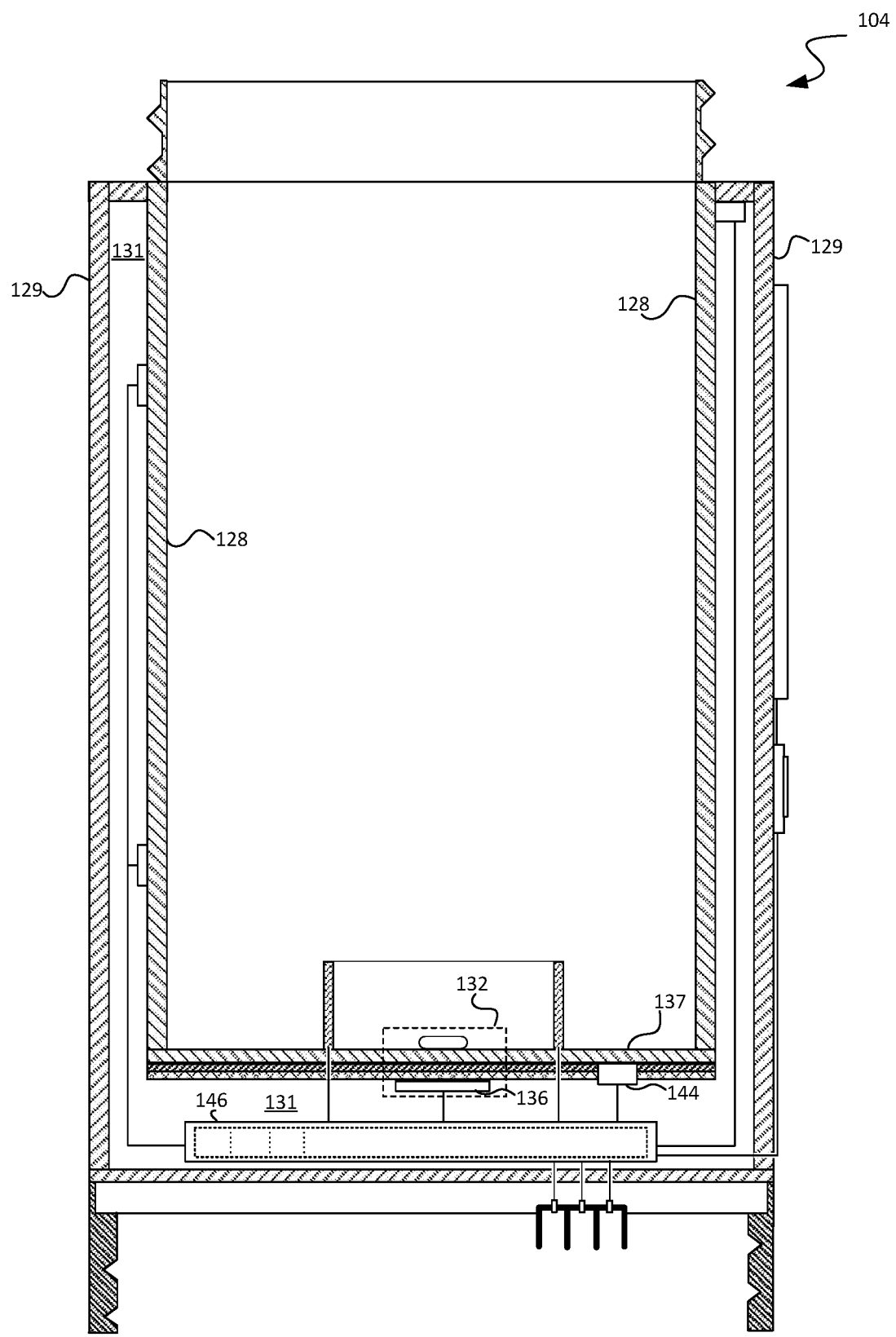
FIG. 8 is a schematic cross-sectional side view of a body member of the liquid food item preparation device illustrating an alternative arrangement of components of the liquid food item preparation system in accordance with embodiments of the disclosed technology.

In some embodiments, the circuit board 146 is configured within the vacuum chamber 131. To manufacture the device 100 such that the circuit board is within the vacuum chamber (as shown in FIG. 8), the outer shell 129 can be sleeved over the inner shell 128 and welded along the circular junction 156. The outer shell base 135 can be formed from stainless steel sheet-metal that is stamped to the diameter of outer shell 129.

The outer shell base 135 can be simultaneously stamped for holes required, for example, for vacuum extraction and access to the power socket 171. All surface mounted components, including power socket 171 and mixer motor device 136, can be connected and/or surface-mounted to circuit board 146. Plastic or stainless steel standoffs can be adhered to reserved "blank" spaces on the circuit board 146 using a glue or epoxy, such as vacuum epoxy and cured using standard methods. Component connectors 158 can be connected to circuit board 146. The circuit board 146 can be configured adhered to inner shell floor 135 via standoffs (not pictured) using a glue or epoxy, such as vacuum epoxy and cured using standard methods. In some embodiments, standoffs are created as part of the shell base 135 during the creation (e.g. stamping) of the shell base 135 and the circuit board 146 can be created with predrilled holes aligned to standoffs of the shell base 135 such that the circuit board 146 can snap onto the standoffs of shell base 135.

A cover for circuit board 146 (not pictured) can be made from low-off-gassing materials, such as polyetheretherketone (PEEK), fiberglass, or polystyrene and molded into a form that covers the exposed underside of circuit board 146 with cutouts for exposed connectors, such as power socket 171. The cover can be placed over circuit board 146 and sealed along its junction with inner surface floor 135 using a sealing glue or epoxy, such as vacuum epoxy, and cured using standard techniques.

Exposed connectors, such as power socket 171, can be sealed along their junctions with the cover using a sealing glue or epoxy, such as vacuum epoxy, and cured using standard techniques. The outer shell base 135 can be welded along the circular junction of inner shell 129 and outer shell base 135. A seam between the power socket 171 and the outer base shell 135 can be sealed using a glue or epoxy, such as vacuum epoxy, and cured using standard techniques.

A vacuum can be created in the vacuum chamber 131 by connecting a specialized compressor and welder to the vacuum hole on the outer shell base 135 that sequentially and seamlessly creates a vacuum in vacuum chamber 131, and the vacuum chamber can then be welded shut by welding the hole on the outer shell base 135 through which air was extracted.

In some implementations, the screw neck 118 is constructed of stainless steel. For example, the screw neck 118 can be casted from stainless steel separately from the inner shell 128 and outer shell 129 and can be attached at the junction 156 of the inner and outer shells. For example, the screw neck 118 can be attached by welding the screw neck 118 to the junction 156. In some embodiments, the screw neck 118 is configured as part of the inner shell 128 instead of as a separate component that is attached to the inner and outer shells. For example, the inner shell 128 can be casted to include the screw neck 118, and the outer shell 129 can be welded to the inner shell 128 that includes the screw neck 118.

The body member 104 shown in FIG. 5B includes the thermal sensors 142, volume sensor 144, and cap sensor 138 configured on the outer surface of the inner shell 128. The thermal sensors 142, volume sensor 144, and cap sensor 138 can be configured on the outer surface of the inner shell 128 by, for example, attaching these components with an adhesive to the outer surface of the inner shell 128 using a glue or epoxy, such as vacuum epoxy, and cured using standard techniques. The thermal sensors 142, volume sensor 144, cap sensor 138, and heating element 130 are configured to be electrically and communicatively coupled to the circuit board 146, including the processor. As shown in FIG. 5B, the body member can be configured to comprise wire connectors 158 and heating element connectors 173 that pass through holes 160 in the inner shell 128 and/or outer shell 129 to complete a connection between a component, such as the thermal sensors 142, volume sensor 144, cap sensor 138, or heating element 130, and the circuit board 146, and the battery 148 of FIG. 5C when the battery member 106 is attached to the base member 104. In some implementations, the wire connectors 158 are flex connectors that are affixed using an adhesive (e.g., glue) to the outer surface of the inner shell 128 prior to the outer shell 129 being joined with the inner shell 128. In some implementations, at least one of the thermal sensors 142, volume sensor 144, and cap sensor is configured elsewhere in the body member 104, such as on the inner surface of the inner shell 128.

As discussed herein, to connect the circuit board 146, which is configured outside the vacuum chamber 131, and the thermal sensors 142, volume sensor 144, and cap sensor 138, which are configured within the vacuum chamber 131, the wire connectors 158 can be passed through respective holes 160 that are drilled or stamped in the outer shell 129, and a vacuum-grade epoxy can be applied and cured in the hole 160 prior to a vacuum being applied to the vacuum chamber 131 and the inner and outer shells being conjoined. In some implementations, the body member 104 can be configured to include only one hole 160, and multiple wire connectors 158 can be aggregated and passed through the one hole 160. Fewer holes can reduce heat transfer among the liquid holding volume, the vacuum chamber, and a body base 168. The body member 104 shown in FIG. 5B includes multiple vacuum-grade epoxied holes 160 for passing the wire connectors 158 and heating element connectors 173 from outside the vacuum chamber 131 to within.

The thermal sensors 142 can be configured at different locations on the inner shell 128 in order to measure multiple values of temperature so as to estimate a representative temperature for liquid contained in the liquid holding volume. The thermal sensors 142 can also be configured to detect thermal gradients in a liquid in the liquid holding volume. The thermal sensors 142 may comprise standard thermometers configured to generate a temperature reading, which can be provided to the processor.

The body member may comprise the volume sensor 144 configured on the outer surface of the inner shell 128 at the floor 137 of the inner shell 128. The volume sensor 144 can be configured to generate volume data that can be used for calculating fluid volume in the liquid holding volume 126. In some implementations, the volume sensor comprises at least one vibration emitter and at least one vibration sensor. In some implementations, the volume emitter and sensor comprise at least one piezoelectric resonator. In some implementations, the vibration emitter of the volume sensor 144 can be configured to generate a vibration at a first frequency, and the vibration sensor can be configured to measure the time-delay and frequency of vibrations sensed a short time after the generated vibration. Liquid in the liquid holding volume may dampen a generated vibration and when a vibration travelling through a liquid reaches the surface of the liquid, a reflected frequency is generated towards the origin of the initial vibration. Given a known radius of the internal liquid holding volume, r, in meters, a known constant value, v, in meters per seconds, of the propagation of the emitted vibration in a specific liquid (e.g., the speed of sound for frequencies between 800 kHz and 1.2<Hz in human milk) and the time difference between vibration emission and response frequency detection, Δt, in seconds, a liquid volume, v, in milliliters, can be calculated using the equation $$v = \pi r^2 * \left[\frac{(\Delta t * v)}{2}\right] * 10^6.$$

The volume sensor 144 can be configured to periodically measure volume in this manner. In some embodiments, the vibration emitter and the vibration sensor are created using piezoelectric resonators. In some embodiments, the vibration emitter is configured at a different location on the outer side of the inner shell 128 from the vibration sensor. In some embodiments, the vibration emitter and the vibration sensor are the same device. In some embodiments, the volume sensor 144 can be configured on the outer surface of the inner shell at a floor 137 of the inner shell.

In some embodiments, the volume sensor 144 can comprise at least one light emitter and at least one light detector that are configured on the inner surface of the inner shell 128. For example, an array of at least two light emitters (e.g. infrared light emitters) can be configured vertically on the inner surface of the inner shell 128, and a one-to-one matching array of at least two light sensors (e.g. infrared light sensors) can be situated vertically on the inner surface of the inner shell and directly across from the light emitters. Each light emitter can be configured to emit a wavelength of light that is detected by the counterpart light detector at that height. When liquid is present in the liquid holding volume, the liquid blocks or diffuses the light emitted by those emitters submerged in the liquid, and volume can be calculated based on measurements of light from each light detector.

A light emitter can emit a known wavelength spectrum of light (e.g. infrared) when power is applied. A light detector may be a photoelectric resistor that is factory-calibrated to a specific spectrum (e.g. infrared) and varies its resistivity based on the strength of light it detects. A light detector connected to a voltage source can be configured to output a variable voltage based on the intensity of light it senses from a corresponding emitter. The processor can be configured to detect voltage deviations by light detectors from the expected value, which is the value corresponding to an unobstructed detection by a detector of light emitted by its paired emitter. Each infrared light emitter/detector pair can be positioned along the inner shell 128 at incremental heights corresponding to different volume levels. For example, to determine liquid volume to a nearest 20 mL floor the lowest emitter/detector pair can be placed at a height corresponding to approximately 0 mL liquid volume to cover the case where no liquid is within the liquid holding volume 126. The next emitter/detector pair can be placed at a height corresponding to a 20 mL liquid volume. The next emitter/detector pair can be placed at a height corresponding to a 40 mL liquid volume, and so on up to the desired maximum volume level (e.g. 240 mL). When liquid is added to the liquid-holding volume, it will submerge some or all of the emitter/detector pairs. Depending on the liquid type, the emitters light will either be refracted or all together blocked from their paired detector. Those emitter/detector pairs that are not submerged will generate a normal detection signal. In this example, the processor can be configured estimate liquid volume to the nearest 20 mL floor by identifying the highest detector in the array returning an abnormal signal.

The cap sensor 138 can be configured to detect and read data from the cap tag 140 of the cap member 102. The cap sensor 138 can be configured to transmit detected data to the processor. The cap sensor 138 can be used for detecting the presence of the cap member 102 and/or identifying information for the cap member 102 when the cap tag 140 is detected. The cap sensor 138 can be configured to detect and read the corresponding cap tag 140 of the cap member 104. In some embodiments, the cap sensor 138 is a standard RFID sensor. For example, the cap sensor 138 can be configured to generate an interrogation signal and detect a resulting signal induced in the cap tag 140. In some embodiments, the cap sensor 138 can comprise a contact switch arranged at the junction 156 of the inner shell 128 and outer shell 129, where it can contact a corresponding cap tag 140 configured on the cap member 102 when the cap member is attached to the body member 104. In some embodiments, the cap sensor 138 comprises a contact switch that is configured to generate a signal indicating that the cap member 102 is securely fastened to the body member 104.

The body member 104 includes the display 110 and the button 112 configured on the outer surface of the outer shell 129. The display 110 and the button 112 can be affixed to the outer surface of the outer shell 129 by an adhesive such as a vacuum epoxy. The display 110 and the button 112 can be configured to be electrically and communicatively coupled to the circuit board 146 via wire connectors 158. The wire connectors 158 can be passed from a body base 168 to the outer surface of the outer shell via a conduit 162 in a body base wall 169 of the body base 168. The wire connectors 158 can be secured to the outer surface of the outer shell 129 using an adhesive. The display can be connected and wired to the circuit board 146 after the inner shell 128 and the outer shell 129 have been joined.

In some implementations, the body member 104 can be configured to include a thermal reflector 164 configured on the outer surface of the inner shell 128 at the floor 137 of the inner shell 128. The thermal reflector 164 may comprise a layer of copper and/or titanium dioxide deposited on the outer surface of the inner shell 128 at the floor of the inner shell 128. The layer of copper may be deposited via metal plating techniques. The body member 104 can be configured to include a thermal insulator 166 configured on the thermal reflector 164. The thermal insulator 166 may comprise, for example, a layer of silicone deposited on the thermal reflector 164 as a painted or sprayed layer via standard manufacturing techniques. In some embodiments, a thermal reflector and thermal insulator can be deposited on the outer surface of the inner shell 128 at locations beyond the floor 137.

The body member 104 can be configured to include the body base 168 defined on one side by the outer surface of the outer shell 129 at the outer shell base 135 and by the body base wall 169 of the body base. The body base 168 can be configured to house components, such as the circuit board 146, outside of the vacuum chamber 131 and the liquid holding volume and within the body member 104. The body base wall 169 can also be configured to define female screwing threads 170 for receiving complementary male screwing threads 114 of the battery member 106 and attaching with the battery member 106. The body base wall 169 can constructed out of plastic or metal, for example, stainless steel, and welded onto the outer surface of the outer shell 129 at a circumference of the outer shell base 135, thereby encasing the components therein in the body base 168. The body base wall 169 can be configured to include the power socket 171 that is configured to electrically couple to a corresponding power terminal 145 of the battery member 106 when the battery member 106 is attached to the body member 140. The power socket 171 can be electrically connected to the circuit board 146 in the body base 168.

The body member 104 can be configured to include the circuit board 146. The circuit board can be mounted in the body base 168 by attaching the circuit board to mounts glued on the internal surface of the body base wall 169. The circuit board 146 can comprise at least some components of a computing system 300, as described herein. For example, the circuit board can comprise a processor and memory. The circuit board 146 can also be configured to include various sensors and other circuitry, including an orientation sensor 175. An orientation sensor can also be configured discrete from the circuit board and can be attached to the outer surface of the outer shell 129. In some embodiments, the orientation sensor 175 can comprise a tilt sensor, an accelerometer, and/or a gyroscope, used individually or in combination. The circuit board can also comprise communications hardware modules, such as WiFi and Bluetooth transceivers. The circuit board 146 and computing system 300 can be electrically and communicatively coupled with the heating element 130, mixer device 132 (comprising the mixer motor 136 and mixing element 134), cap sensor 138, thermal sensor 142, and volume sensor 144, and also with the display 110 and button 112. These components can also be coupled to the battery 148 of the battery member 106, via the power socket 171, when the battery member 106 is attached with the body member 104.

The body member 104 includes the heating element 130 configured on the inner surface of the inner shell 128 at the floor 137 of the inner shell 128. The body member 104 includes the mixing element 134 disposed on the inner surface of the inner shell 128. The mixing element is configured to be coupled with the motor device 136 such that the motor device causes the mixing element to spin around a center axis, thus agitating and stirring a liquid food item contained in the liquid holding volume 126. The heating element can be powered via heating element connectors 173. In some implementations, the heating element connectors 173 can comprise a positive voltage line to the power source and a ground line. In some implementations, the heating element connectors 173 can comprise a positive voltage line to the power source and a common ground using the inner shell 128 via heating element lining 177. The heating element 130 may be configured comprising resistive elements connecting the positive voltage line and ground line. The heating element connectors 173 can be passed through at least one hole 160 through each of the inner shell 128 and outer shell, and any layers 164, 166 therebetween. Holes made in the inner or outer shells 128, 129 can be sealed by curing a vacuum rated epoxy in the holes.

FIG. 5C shows the battery member 106, including a battery 148, male screw threads 114, and a battery connector 145. The battery connector 145 is configured to electrically connect the battery 148 with the circuit board 146 when the battery member 106 is attached to the body member 104. The battery member 106 can comprise a battery case 147. The battery case 147 may be molded out of, for example, stainless steel or plastic.

Figure 6A:
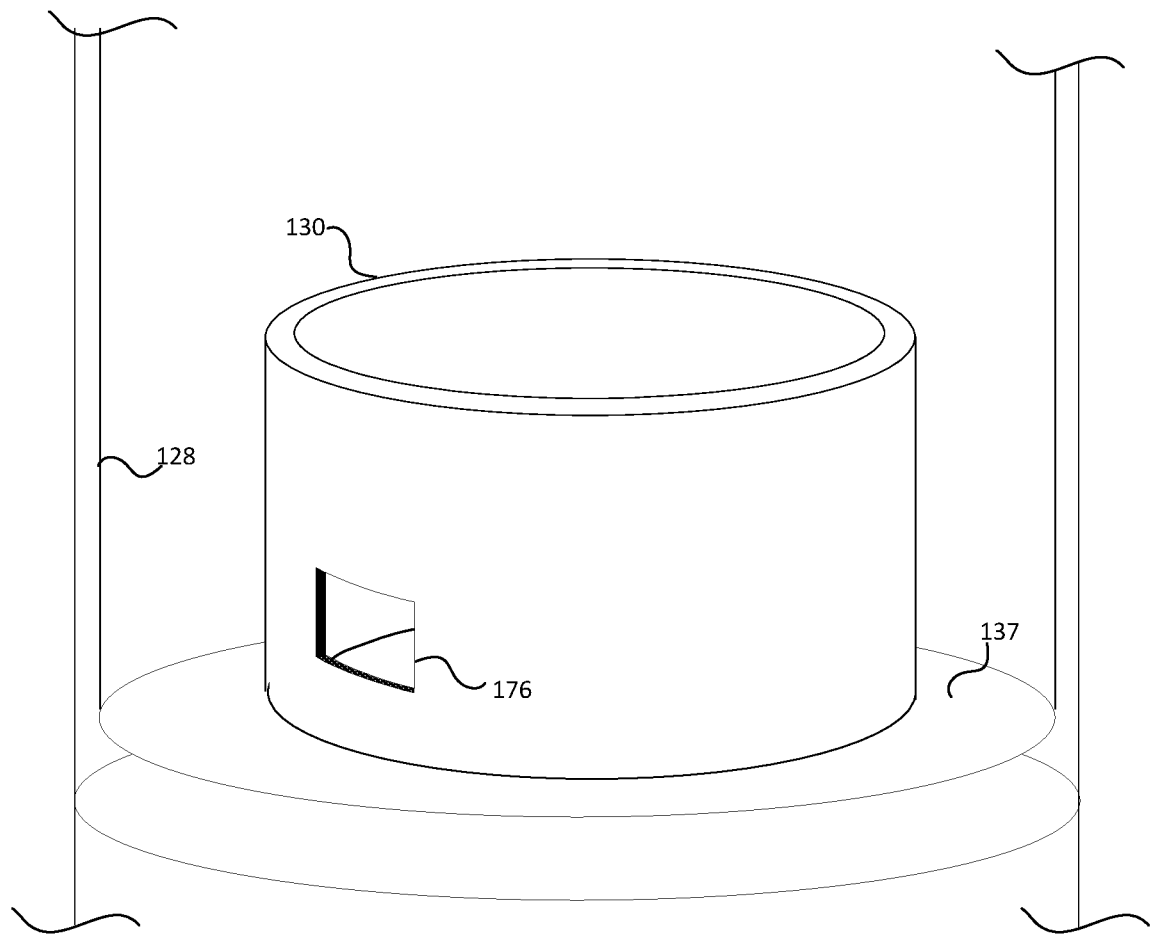
FIGS. 6A-B are schematic perspective views of a heating element and mixer device of the liquid food item preparation device in accordance with embodiments of the disclosed technology.
Figure 6B:
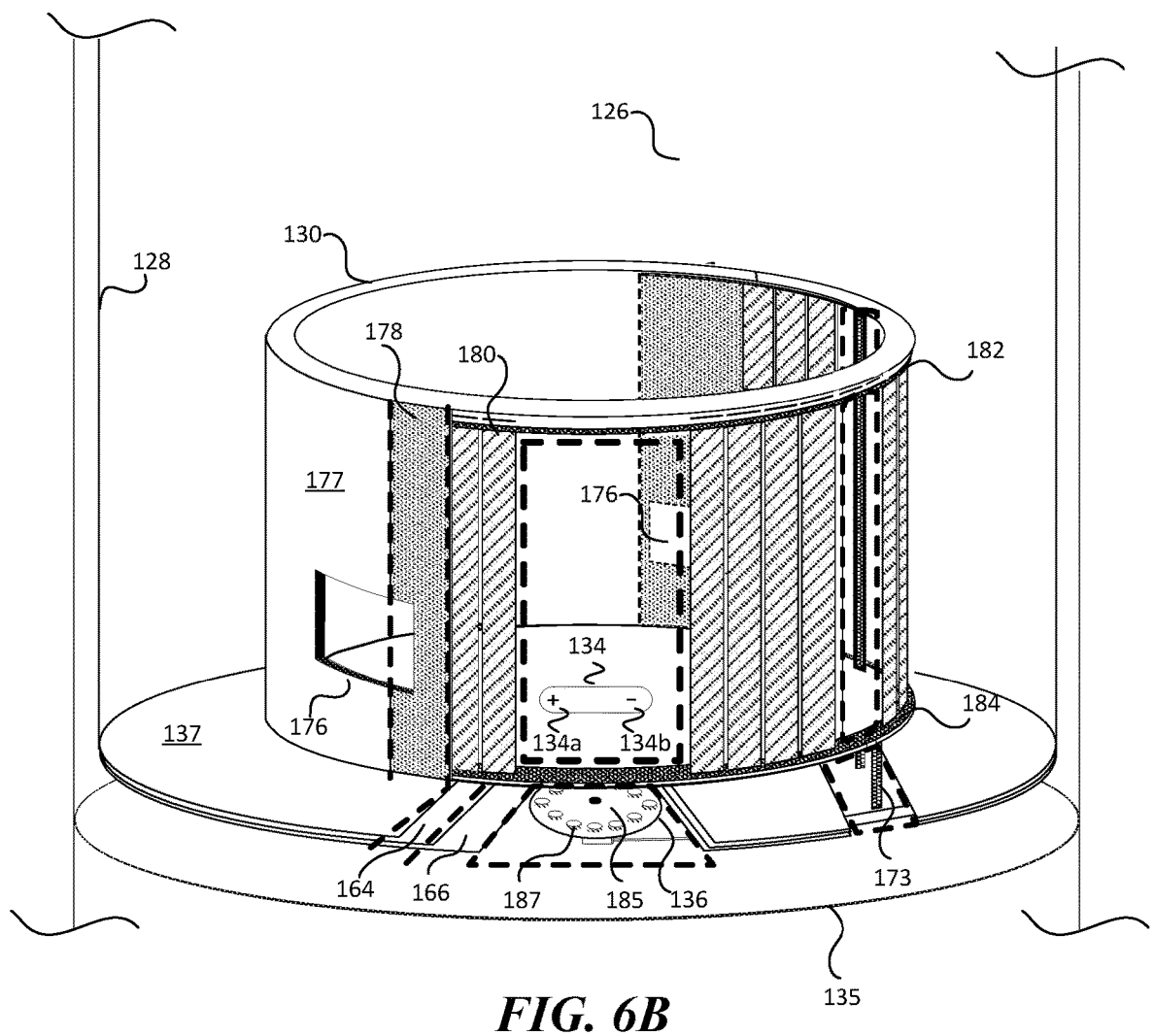

FIG. 6A-B are schematic perspective views of the heating element 130 and mixing element of the liquid food item preparation device 100 in accordance with embodiments of the disclosed technology. As shown in FIG. 6A, the heating element 130 can be configured at the floor 137 of the inner shell 128 on an inner surface of the inner shell 128 of the body member 104. The inner shell 128 and outer shell are shown in FIG. 6A as cut away and transparent for purposes of clarity. The heating element 130 can include a flow window 176 for passing a liquid food item around the heating element 130 on all surfaces of the heating element in order to mix the liquid food item within the liquid holding volume of the body member 104.

FIG. 6B shows a stripped-down view of the heating element 130, showing layers and components of the heating element 130. Dashed lines indicate that at least one layer has been removed for the illustration. The heating element 130 can comprise multiple resistive elements 180 connected between power rails, including a positive power rail 182 and a ground rail 184. The positive power rail 182 can be electrically connected to the power socket 171 of the body member 104 (FIG. 5B) via heating element connector 173. The positive power rail 182 can be electrically connected to the power socket 171 via a PWM-actuated, processor controlled MOSFET switch in between the power socket 171 and the positive power rail 182. The ground rail 184 can be connected to a ground (e.g., the outer shell 129 (FIG. 5B)) via a heating element connector 173. In some embodiments, the ground rail 184 can be connected to a ground (e.g., the outer shell 129 (FIG. 5B)) via a heating element liner 177. The resistive elements 180 can be coated in a non-electrically conductive thermal compound 178, such as magnesium oxide, and a heating element lining 177, such as stainless steel.

The mixer motor 136 is configured below the floor 137 of the inner shell 128, the thermal reflector 164, and the thermal insulator 166, and below the outer shell base 135. In some embodiments, the mixer motor 136 can be configured to comprise multiple magnets 187 of alternative polarity arrange in a circular fashion on a spinning plate 185 of the motor 136. The mixer element 134 can be configured to comprise a magnetically positive side 134a and a magnetically negative side 134b. The mixer element 134 can be configured to be magnetically coupled to the motor 136 such that the mixer element 134 is magnetically forced to the floor 137 of the inner shell 128. The motor 136 can be configured to cause the spinning plate 185 to spin when a mixing signal is applied to the motor 136. The motor 136 can cause the mixing element 134 to rotate above the motor on the inner surface of the inner shell 128 at the floor 137 of the inner shell. A liquid food item contained in the liquid holding volume 126 can be mixed and pushed around the surfaces of the heating element 130 as a result of the rotation of the mixer element 134.

Figure 7:
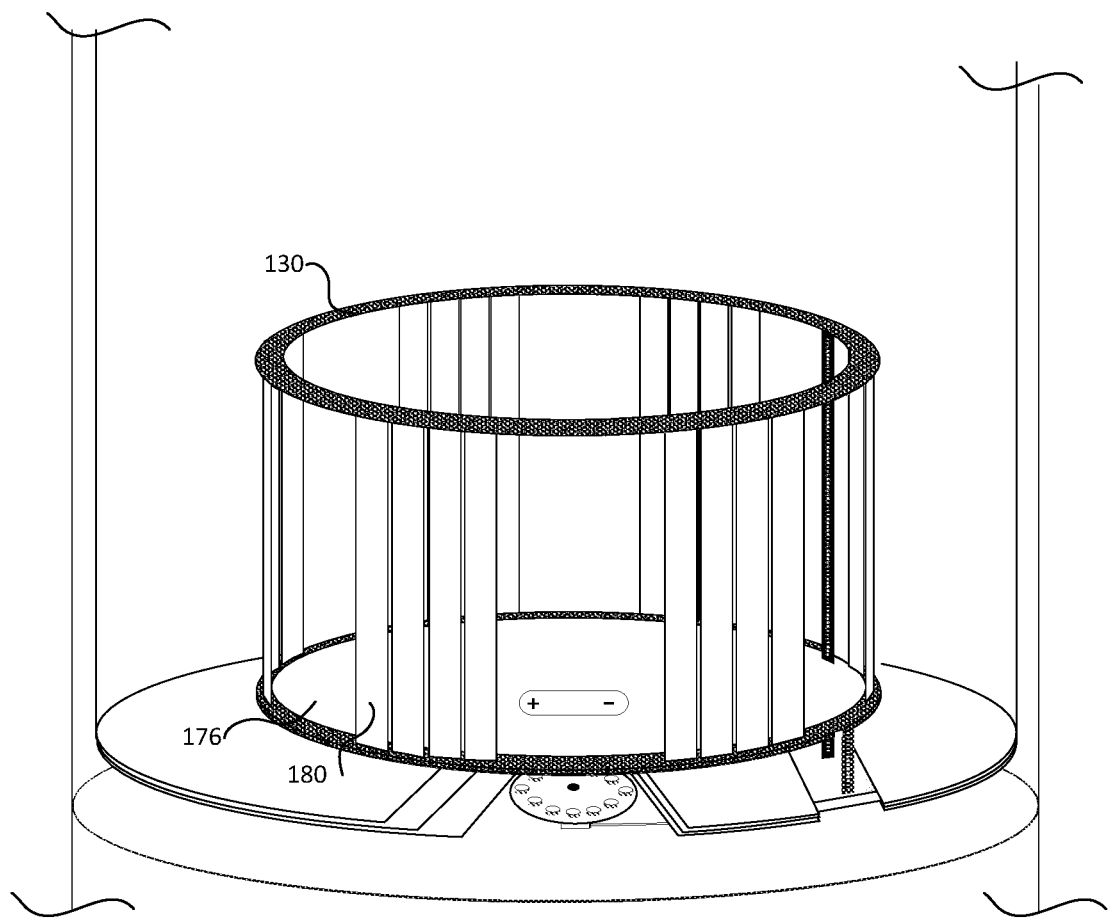
FIG. 7 is a schematic diagram showing a perspective view of an alternative heating element of the liquid food item preparation device in accordance with embodiments of the disclosed technology.

FIG. 7 is a schematic diagram showing a perspective view of an alternative heating element 130 of the liquid food item preparation system in according with some embodiments of the disclosed technology. The heating element 130 includes groups of four resistive panels 180 arranged around the circumference of the heating element 130. The heating element 130 can comprise flow windows 176 separating each grouping of four resistive panels 180, enabling a greater flow of liquid around the mixing element 134. The resistive panels 180 depicted in FIG. 7 can be coated in a non-electrically conductive thermal compound and additional linings.

FIG. 8 is a schematic cross-sectional side view of a body member 104 of the liquid food item preparation device 100 illustrating an alternative arrangement of components of the liquid food item preparation device 100 in accordance with embodiments of the disclosed technology. Some components of the device 100 described with respect to FIG. 5B that were configured outside the vacuum chamber 131 in the embodiments in FIG. 5B are configured within the vacuum chamber 131 in the embodiments of FIG. 8. For example, the circuit board 146 and mixer motor 136 are arranged within the vacuum chamber 131 between the inner shell 128 and outer shell 129. The volume sensor 144 is shown configured on the outer surface of the inner shell at the floor 137 of the inner shell 128.

Figure 9:
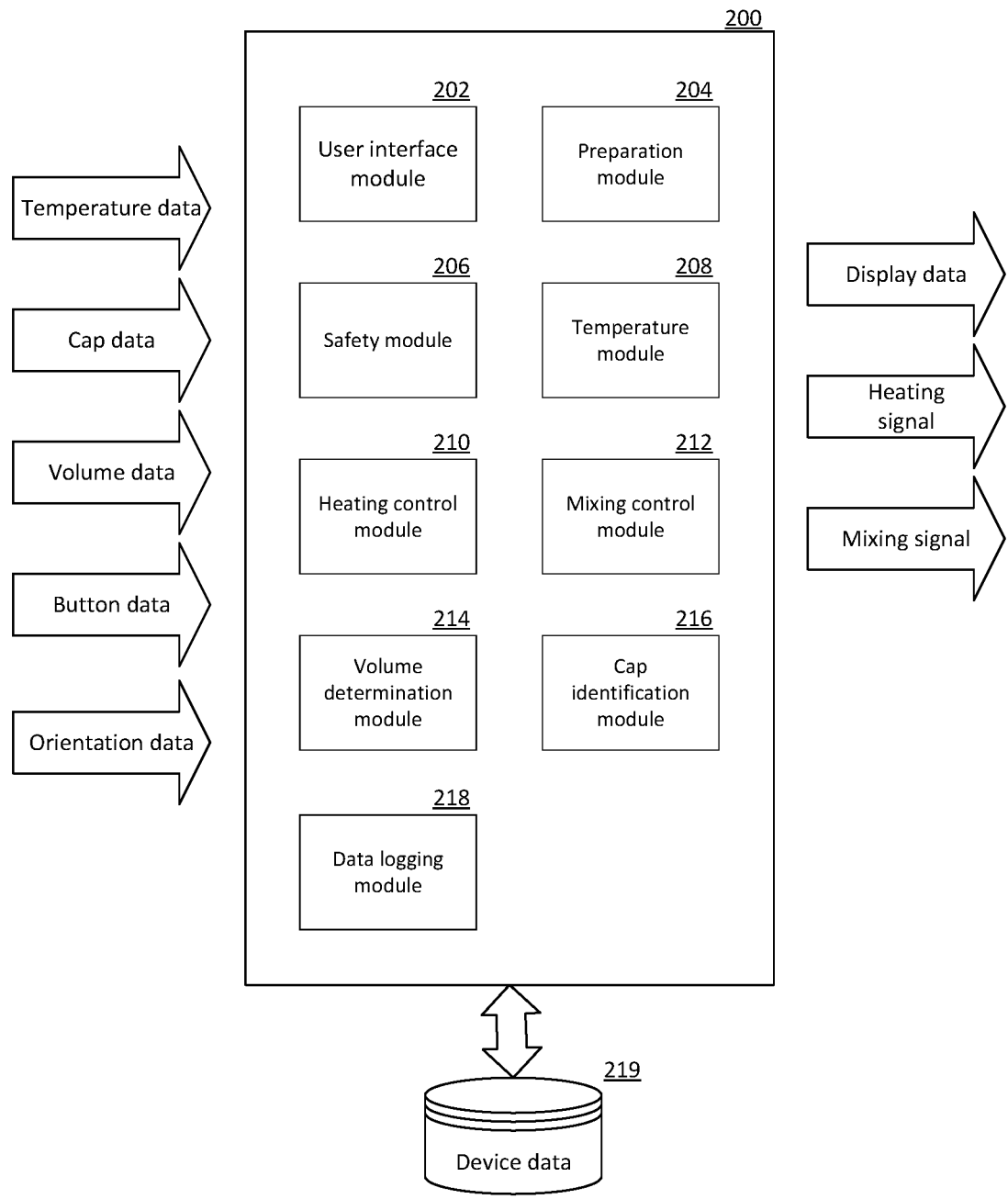
FIG. 9 is a schematic diagram illustrating certain hardware/software components of a control system for the liquid food item preparation device in accordance with embodiments of the disclosed technology.

FIG. 9 is a block diagram illustrating hardware/software components of a control system 200 for the liquid food item preparation device 100. Even though various embodiments of the control system 200 are described below with reference to the liquid food item preparation device 100 of FIGS. 1-8, in other embodiments, the control system 200 can also be performed with other suitable types of computing frameworks, systems, components, devices, or modules.

The control system 200 comprises a user interface module 202, a preparation module 204, a safety module 206, a temperature module 208, a heating control module 210, a mixing control module 212, a volume determination module 214, a cap identification module 216, and a data logging module 218. The control system 200 can be configured to receive temperature data from the thermal sensors 142, cap data from the cap sensor 138, volume data from the volume sensor 144, button data from the button 112, and orientation data from the orientation sensor 175, and to generate display data for operating the display 110, a heating signal for operating the heating element 130, and a mixing signal for operating the mixer motor 136.

The user interface module 202 can be configured to receive button data and generate display data. The button data can comprise, for example, data indicating that the button 112 is being pressed. The user interface module 202 can be configured to determine a user input based at least in part on comparing the button data with data associated with predefined instructions. For example, a sensed long press (e.g., one second engagement of the button) may be associated with an instruction to prepare a liquid food item, while two sensed consecutive taps can be associated with a user settings input mode that allows a user to change settings for the device 100. When, for example, a long press is sensed, the user interface module 202 can determine that an instruction to enter a heating mode has been received.

The user interface module 202 can be configured to generate display data based at least in part on information provided by the preparation module 204, temperature module 208, safety module 206, heating control module 210, mixing control module 212, volume determination module 214, and cap identification module 216. For example, the user interface module can be configured to generate data for displaying, via the display device 110, a temperature of the liquid holding volume, as determined by the temperature module 208 based on temperature data received from the thermal sensors 142.

In some implementations, the liquid food item preparation device 100 comprises additional or other components that can be used for interfacing with a user. For example, the device 100 may comprise a touchscreen device, and the user interface module 202 can be configured to determine a user input based on detected touch input sensed by the touchscreen device. In some implementations, the device 100 is configured to communicate with another device via, for example, Bluetooth, and the user interface module 202 can be configured to receive user input via the other device and generate data that can be used by the other device to display information to the user. For example, the device 100 may be configured to connect via Bluetooth with a smartphone, and the smartphone can be configured to generate user interfaces comprising data provided by the user interface module 202. An application running on the smartphone can display historical feeding data, receive user input (e.g. timer input for entering a preparation mode), and so forth.

The preparation module 204 can be configured to determine whether the liquid food item preparation device 100 is to prepare a liquid food item, and to generate instructions for preparing the liquid food item. The instructions for preparing the liquid food item can be provided to the heating control module 210 and the mixing control module 212. The preparation module 204 can also provide data to the user interface module 202, which can be used, for example, to provide system status information to the user via the display device 110. The preparation module 204 can also be configured to provide data related to preparation to the safety module 206, including, for example, whether the heating control module 210 is being instructed to power the heating element 130.

The preparation module 204 can be configured to determine whether the device 100 is to prepare a liquid food item based at least in part on receiving an instruction to prepare the liquid food item. In some implementations, the preparation module 204 can be configured to determine to prepare a liquid food item when user input data provided by the user interface module 202 comprises an instruction to prepare the liquid food item. For example, the instruction may comprise to enter a preparation mode of the device 100. In some implementations, the instruction comprises an instruction to immediately enter the preparation mode. For example, the instruction may be generated based on a detected long press of the button 112. In some implementations, the instruction comprises an expiration of a timer, the timer determined based on input from the user.

The preparation module 204 can be configured to cause the device 100 to prepare a liquid food item by generating heating instructions and mixing instructions that are provided to the heating control module 210 and mixing control module 212, respectively. Heating instructions can comprise, for example, a duty cycle for a pulse-width modulated (PWM) signal for powering the heating element 130. Mixing instructions can comprise, for example, a duty cycle for a PWM signal for powering the mixer motor 136. In some implementations, heating and mixing instructions can respectively also comprise a duration of time that power should be applied to the heating or mixing element.

The preparation module 204 can be configured to determine heating and mixing instructions based at least in part on data provided by the temperature module 208 and volume determination module 214. In some implementations, the preparation module 204 can be configured to determine heating and/or mixing instructions based at least in part on data contained in a table stored in device data storage 219, the table containing predetermined heating and mixing instructions stored in association with volume and/or temperature values. The preparation module 204 can be configured to compare volume and/or temperature information received from the temperature module 208 and/or volume determination module 214 with the volume and temperature values in the table to identify associated heating and/or mixing instructions. For example, the preparation module 204 may periodically compare a received temperature value to temperature values contained in the table, the temperature values including instructions for temperatures within a temperature range. Heating instructions for a sensed temperature within a first temperature range may, for example, be different from heating instructions for a sensed temperature in a second temperature range. Heating instructions may, for example, comprise a duty cycle for a PWM signal when the temperature in the liquid holding volume is between 20 degrees Fahrenheit and 5 degrees Fahrenheit from a consumption temperature, and a lower frequency duty cycle for a PWM signal when the temperature in the liquid holding volume is between 5 degrees Fahrenheit from the consumption temperature. In some implementations, the heating instructions can also include a magnitude and/or time duration for the heating signal.

In some implementations, the preparation module 204 is configured to determine heating instructions for the heating control module 210 based on a function whose variables include at least measured volume and/or measured temperature, as provided by the volume determination module 214 and the temperature module 206, respectively. In some implementations, the preparation module 204 is configured to determine mixing instructions for the mixing control module 212 based on a function whose variables include at least a measured volume and/or a measured temperature. In some implementations, the preparation module 204 is configured to generate mixing instructions that powers the mixer motor 136, causing the mixing element 134 to spin, whenever the heating instructions comprise an instruction to power the heating element 130.

In some implementations, the preparation module 204 can be configured to determine heating and/or mixing instructions based at least in part on information provided by the cap identification module 216. For example, a table comprising heating instructions may include instructions to reduce a PWM frequency included in heating instructions when a first cap is sensed attached to the device 100, relative to when a second cap is sensed attached to the device 100.

In some implementations, prior to or during preparation of a liquid food item, the preparation module 204 can be configured to determine whether the device 100 is fit for liquid food item preparation. In response to determining that the device 100 is fit for liquid food item preparation, the preparation module 204 can proceed with preparation of the liquid food item if such an instruction is received. In response to determining that the device 100 is unfit for liquid food item preparation, the preparation module 204 can be configured to discontinue liquid food item preparation or refrain from commencing liquid food item preparation if it has not begun. In response to determining that the device 100 is unfit for liquid food item preparation, the preparation module 204 can be configured to generate heating and/or mixing instructions for directing the heating control module 210 and/or mixing control module 212 to refrain from powering the heating element 130 and/or the mixing motor 136.

In some implementations, the preparation module 204 is configured to determine whether the device 100 is fit for liquid food item preparation based at least in part on data received from the safety module 208. In some implementations, data provided by the safety module 206 includes a flag indicating whether the device 100 is fit or unfit for liquid food item preparation.

In some implementations, the safety module 206 can be configured to generate an unfit flag when a value for a safety characteristic associated with the device 100 or a device component does not meet criteria for an acceptable value for the safety characteristic, the acceptable value being associated with the device being fit for preparation of the liquid food item. In some implementations, the safety module 206 is configured to monitor predefined safety characteristics associated with the device 100 or a device component. For example, in some implementations, the safety module 206 can be configured to periodically sample a value of a safety characteristic and compare the sampled value to acceptable values for the safety characteristic.

In some implementations, a safety characteristic associated with the device 100 comprises volume of liquid food item in the liquid holding volume 126. For example, the safety module 206 can be configured to generate an unfit flag when an observed volume of a liquid food item, as received from the volume determination module 214, is less than a predetermined minimum threshold volume for liquid food item preparation. In some implementations, a safety characteristic comprises an orientation of the device 100. For example, the safety module 206 can be configured to generate an unfit flag when it determines that an orientation of the device 100 is not within a predetermined acceptable range of orientation for liquid food item preparation. The safety module 206 may receive orientation data generated by the orientation sensor 175 and compare the orientation data with predetermined orientation values associated with acceptable orientations of the device for liquid food item preparation. As an example, an acceptable orientation may comprise any orientation within +−5 degrees of upright. The safety module 206 can be configured to generate an unfit tag when orientation data received from the orientation sensor is not within the degree of range of acceptable orientations.

Other safety characteristics that the safety module 206 can be configured to monitor for determining whether to generate an unfit flag include a temperature of the battery 148 as measured and provided by a battery thermometer configured in the battery member 106, a current drain on the battery 148 as compared to a maximum allowable current drain, a voltage of the battery 148 as compared to a minimum battery voltage threshold for preparation, an output voltage of the battery 148 as compared to a maximum allowable output voltage, and a measured temperature at the circuit board (or any integrated circuits thereon) as compared to a predetermined maximum temperature.

The temperature module 208 can be configured to receive temperature data from thermal sensors 142 and calculate a temperature of the liquid food item based on the received temperature data. In some implementations, the temperature data comprises a single temperature reading captured by a single thermal sensor 142, and the temperature module 208 can provide other components of the system 200 the single temperature reading. In some implementations, the temperature data received from thermal sensors 142 can comprise multiple temperature readings captured simultaneously by different thermal sensors 142 configured on the device 100. The temperature module 206 can be configured to generate a composite temperature that is determined based at least in part on each of the multiple temperature readings. For example, the temperature module 206 can be configured to compute an average of the multiple temperature readings to create a composite temperature. The temperature module 206 can provide the composite temperature to other modules when two or more thermal sensors are used for sensing temperature.

The heating control module 210 can be configured to receive heating instructions from the preparation module 204 and generate a heating signal based at least in part on the heating instructions. For example, the heating control module 210 can be configured to receive, from the preparation module 204, a value for a duty cycle of a PWM signal and to generate a PWM signal having the received duty cycle for powering the heating element 130. In some implementations, the heating control module 210 can be configured to generate a heating signal for a duration of time specified in the heating instructions received from the preparation module 204. In some implementations, the heating control module 210 can be configured to generate a heating signal as long as the preparation module 204 is providing a heating instruction, and the heating control module 210 can be configured to discontinue generating the heating signal when the heating instruction is no longer being received.

The mixing control module 210 can be configured to receive mixing instructions from the preparation module 204 and generate a mixing signal based at least in part on the mixing instructions. For example, the mixing control module 212 can be configured to receive, from the preparation module 204, a value for a duty cycle of a PWM signal and to generate a PWM signal having the received specified duty cycle for powering the mixing motor 136, and thereby engaging the mixing element 134. In some implementations, the mixing control module 212 can be configured to generate a mixing signal for a duration of time specified in the mixing instructions received from the preparation module 204. In some implementations, the mixing control module 212 can be configured to generate a mixing signal as long as the preparation module 204 is providing a mixing instruction, and the mixing control module 212 can be configured to discontinue generating the mixing signal when the mixing instruction is no longer being received.

The volume determination module 214 can be configured to receive volume data from the volume sensor 144 and calculate a volume measurement for liquid in the liquid holding volume 126 of the device 100 based at least in part on the received volume data. In some implementations, volume data comprises a frequency of a vibration produced by the volume sensor 144 and a frequency of a resulting vibration sensed in the device by the volume sensor 144 a short time after the produced vibration.

The cap identification module 216 can be configured to receive cap data from the cap sensor 138. The cap data may comprise an indication that a cap is present on the device 100. The cap data may also comprise an identifier associated with the cap present on the device 100. For example, the cap data may comprise an identifier of a detected RFID tag that can be compared with identifiers associated with various types of caps. In some embodiments, the cap identification module 216 provides information related to a cap that is present on the device 100 to the user interface module 202, preparation module 204, and/or the safety module 208.

The control system 200 can also include a data logging module 218 for capturing data associated with the operation of the device 100, such as preparation data and consumption data. For example, preparation data may comprise measurements including time, temperature, volume, and so forth. Consumption data may comprise time of consumption, temperature of liquid at preparation time, volume of liquid consumed, and so forth. The captured data associated with the operation of the device can be stored in device data storage 219 and exported via, for example, Bluetooth to a mobile device such as a smartphone. Device data storage 219 can include other data for the device as well, including consumption temperature data, data related to preparation, and so forth.

Figure 10A:
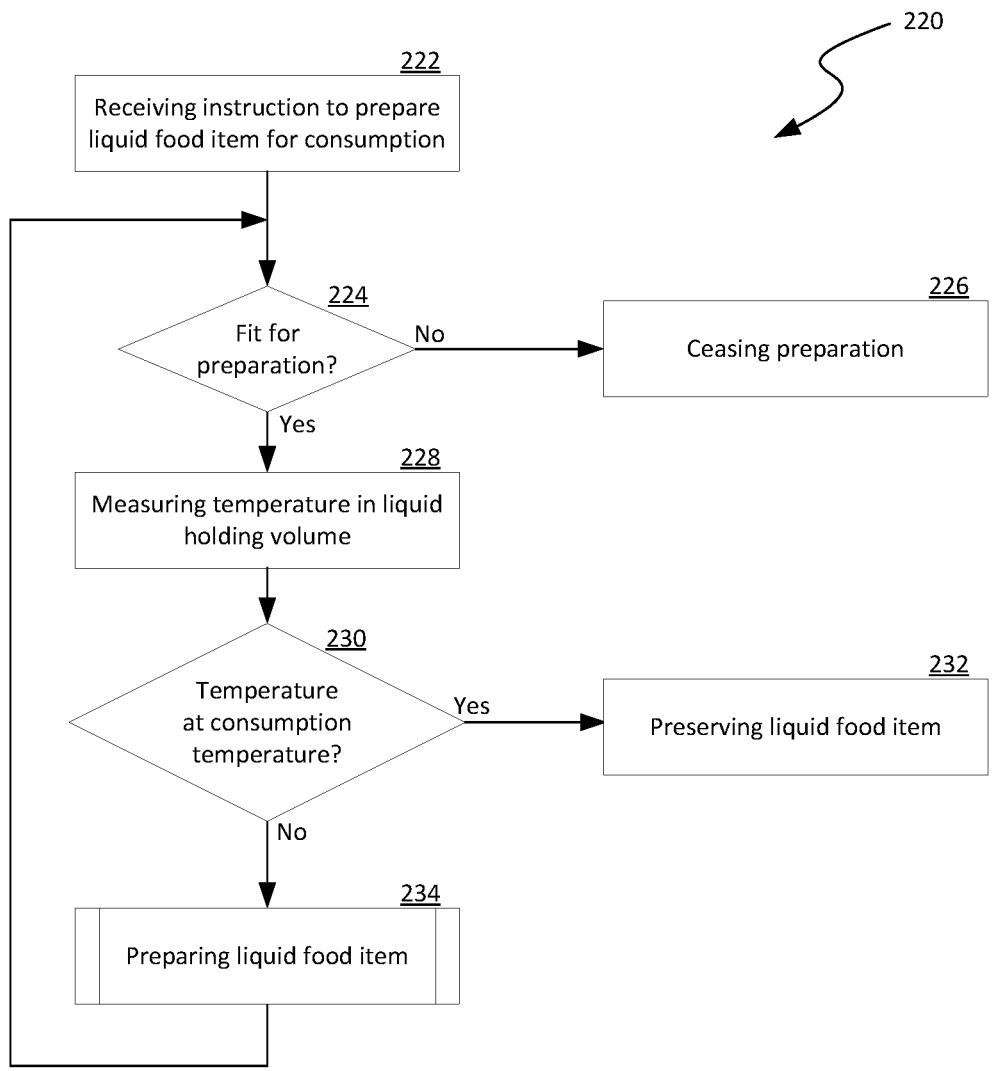
FIGS. 10A-B are flowcharts illustrating various processes of preparing a liquid food item for consumption in accordance with embodiments of the disclosed technology.
Figure 10B:
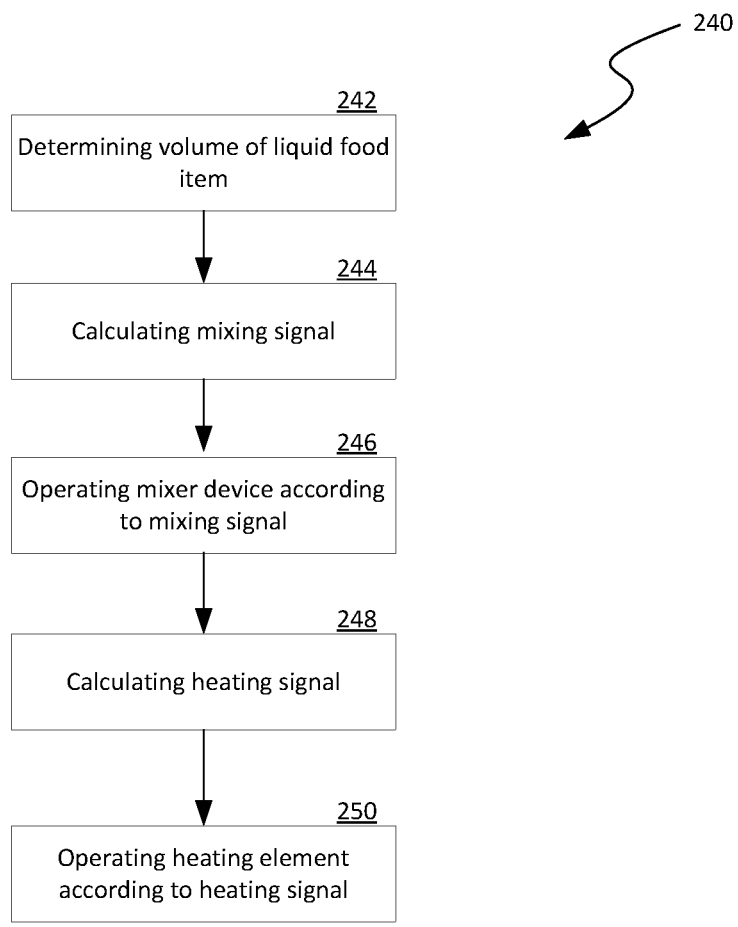

FIGS. 10A-B are flowcharts illustrating various processes of preparation of a liquid food item in accordance with embodiments of the disclosed technology. Even though various embodiments of the processes are described below with reference to the liquid food item preparation device 100 of FIGS. 1-8 and the control system 200 of FIG. 9, in other embodiments, the processes can also be performed with other suitable types of computing frameworks, systems, components, devices, or modules.

As shown in FIG. 10A, a process 220 can include receiving an instruction to prepare a liquid food item for consumption at stage 222. The instruction may comprise, for example, an indication of a button press being received, the button press associated with an instruction to prepare a liquid food item.

The process 220 can then include determining whether the liquid food item preparation device 100 is fit for preparation of the liquid food item at decision stage 224. In some implementations, determining whether the liquid food item preparation device 100 is fit for preparation of the liquid food item comprises monitoring values for a predetermined set of safety characteristics associated with the device and determining whether any value does not meet criteria for an acceptable value for the respective safety characteristic associated with the value, the acceptable value being associated with the device being fit for liquid food item preparation with respect to that safety characteristic.

If the liquid food item preparation device 100 is determined to be unfit for preparation of the liquid food item, the process 220 can include discontinuing preparation of the liquid food item at stage 226. In some implementations, discontinuing preparation of the liquid food item can comprise refraining from commencing liquid food item preparation. In some implementations, discontinuing preparation of the liquid food item can comprise halting preparation of a liquid food item, including halting application of a voltage across a heating element and/or a mixer motor. In some implementations, the liquid food item preparation device 100 can display an interface and/or generate an alarm indicating that the liquid food item preparation device 100 has been determined to be unfit for preparation.

If the liquid food item preparation device 100 is determined to be fit for preparation of the liquid food item, the process 220 can include measuring a temperature in the liquid holding volume of the liquid food item preparation device 100 at stage 228. The process 220 can then include determining whether the measured temperature is at a consumption temperature at decision stage 230. In some implementations, determining whether the measured temperature is at a consumption temperature comprises determining whether the measured temperature is greater than or equal to a consumption temperature. In some implementations, determining whether the measured temperature is at a consumption temperature comprises determining whether the measured temperature is within a buffer range of a consumption temperature. For example, in some implementations, in order to ensure that a liquid food item is not heated beyond a consumption temperature, the liquid food item preparation device 100 can determine that the measured temperature is at the consumption temperature when the measured temperature is less than the consumption temperature by less than a predetermined acceptable temperature difference.

If at decision stage 230 it is determined that the measured temperature of the liquid food item is at the consumption temperature, the process 220 can include preserving the liquid food item at stage 232. In some implementations, preserving the liquid food item comprises refraining from powering the heating element. In some implementations, preserving the liquid food item comprises refraining from powering the heating element while powering a mixer motor. In some implementations, preserving the liquid food item comprises refraining from powering both the heating element and the mixer motor. In some implementations, preserving the liquid food item comprises periodically measuring a temperature of the liquid food item and entering a preparation mode for preparing the liquid food item when the temperature of the liquid food item falls below a threshold consumption preservation temperature. For example, the liquid food item preservation device can be configured to prepare a liquid food item for consumption after it has already been prepared for consumption when a temperature of the liquid food item falls by a predetermined amount from the consumption temperature. In some implementations, preserving the liquid food item can comprise generating an indication and/or an interface indicating that the liquid food item has been prepared. For example, the liquid food item preservation device can generate an alarm when it is determined that the measured temperature of the liquid food item is at a consumption temperature. In some implementations, the liquid food item preservation system includes a buzzer or another audio generation component that can be configured to sound the alarm.

If at decision stage 230 it is determined that the measured temperature is not at the consumption temperature, the process 220 can include preparing the liquid food item at stage 234. In some implementations, preparing the liquid food item can include applying a heating signal and a mixing signal to the heating element and mixer motor for a predetermined duration of time. In some implementations, preparing the liquid food item can include applying a heating signal and/or a mixing signal to the heating element and/or mixing element, respectively, according to at least one function whose variables comprise at least one of a volume of the liquid food item and a temperature of the liquid food item. For example, in some implementations, for preparation of a liquid food item, a heating signal can be applied to a heating element for a greater duration of time for a first measured temperature of the liquid food item relative to the duration of time that the heating signal is applied to the heating element for a second measured temperature, when the first measured temperature is less than the second measured temperature. An example of preparing the liquid food item is described in more detail below with reference to FIG. 10B.

The process 220 can then include returning to decision stage 224 and determining whether the liquid food item preparation device 100 is fit for preparation. In some implementations, the process 220 cycles through stages 224, 228, 230, and 234 until either it is determined that the liquid food item preparation device 100 is unfit for preparation of the liquid food item or the temperature of the liquid food item is at the consumption temperature. In some implementations, the liquid food item preparation device 100 can be configured to receive an instruction from a user to discontinue preparation of a liquid food item, and in response to receiving the instruction, the process 220 can be terminated. In some implementations, stages 224-234 can be performed periodically or continuously. In some implementations, stages 224, 228, 230, and 234 can be performed concurrently. For example, the liquid food item preparation device 100 can be configured to continuously sample temperature in a liquid holding volume and adjust preparation of a liquid food item based at least in part on the sampled temperature. For example, a heating signal and/or a mixing signal can be adjusted as a sampled temperature in the liquid holding volume increases, while the liquid food item preparation device 100 periodically samples measurements to determine whether the liquid food item preparation device 100 is fit for preparation.

FIG. 10B illustrates example operations of preparing a liquid food item. As shown in FIG. 10B, a process 240 includes determining a volume of the liquid food item in the liquid holding volume at stage 242. The operations include calculating a mixing signal at stage 244. In some implementations, calculating a mixing signal comprises calculating a mixing signal based at least in part on the volume of the liquid food item. The operations include operating the mixer motor according to the mixing signal at stage 246. Operating the mixer motor can comprise causing the mixing element to rotate within the liquid holding volume of the device 100. The operations include calculating a heating signal at stage 248. In some implementations, calculating a heating signal comprises calculating a heating signal based at least in part on the volume of the liquid food item and the measured temperature in the liquid holding volume of the device 100. The operations include operating the heating element according to the heating signal at stage 250. Operating the heating element can include applying the heating signal to the heating element, thereby causing the heating element to transfer heat to the liquid food item in the liquid holding volume of the device 100. In some implementations, stages 242, 244, and 248 can be performed concurrently and prior to stages 246 and 250. For example, the liquid food item preparation device 100 can be configured to calculate a mixing signal at stage 244 and calculate a heating signal at stage 248 before operating the mixer device at stage 246 or operating the heating element at stage 250.

FIGS. 9-10B illustrate certain hardware/software components and/or processes for implementation by a liquid food item preparation device in accordance with embodiments of the disclosed technology. In FIGS. 9-10B, and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

FIGS. 11A-B are schematic diagrams showing an embodiment of a cap member comprising a storage cap 188. As shown in FIG. 11A, the storage cap 188 can comprise a cap that includes no hole. The storage cap 188 can be configured to insulate the liquid holding volume of a body member when the storage cap 188 is attached to the body member, such as the body member 104. FIG. 11B shows a schematic cross-sectional side view of the storage cap 188 taken along line GH in FIG. 11A, in accordance with embodiments of the disclosure. The storage cap 188 can be configured to comprise a storage cap base 190, which can be constructed out of, for example, stainless steel. The storage cap 188 can be configured to comprise a layer of insulative material 189 deposited on the entire under surface of the storage cap base 190 that is exposed to the liquid holding volume of a body member that it is attached to, such as the body member 104 of FIG. 5B. In some implementations, the insulative material 189 comprises plastic. The storage cap base 190 can be configured to comprise screwing threads 152. The storage cap base 190 can be configured to include a cap tag 142.

Figure 12:
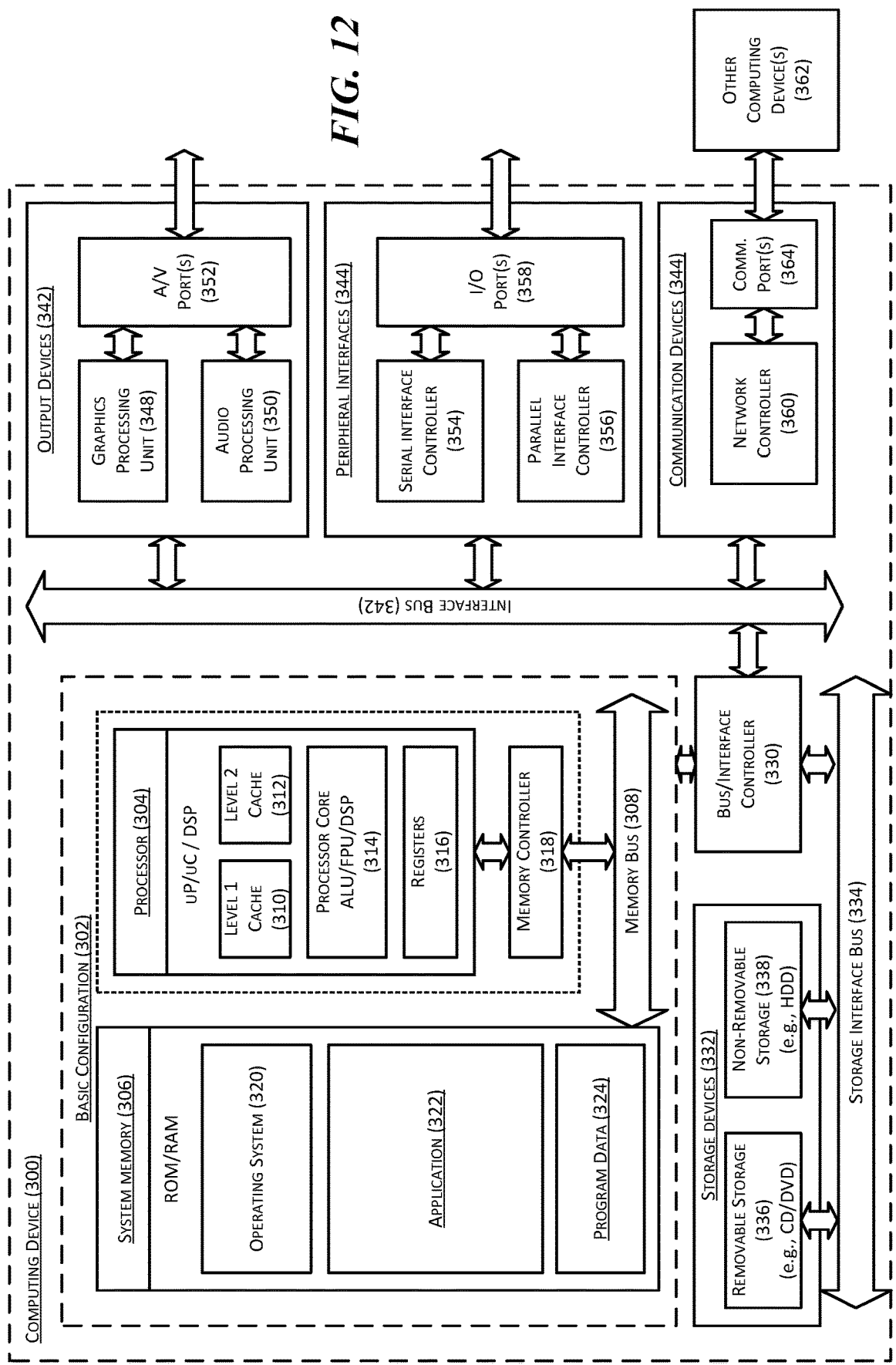
FIG. 12 is a computing device suitable for certain components of the computing system in FIGS. 1-9.

FIG. 12 is a computing device 300 suitable for certain components of the liquid food item preparation device in FIGS. 1-8 and the control system in FIG. 9. For example, the computing device 300 can be suitable for the integrated circuits on the circuit board 146, including the processor and memory. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of the liquid food item preparation device 100. The liquid food item preparation device 100 can be configured to comprise ports as needed. The computing device 300 can be implemented as a portion of small-form factor portable (or mobile) electronic device, an application specific device, or a hybrid device that include any of the above functions.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims. Furthermore, even if not labeled as such, Figures may not be drawn to scale.

I claim:

1. A device for preparing a liquid food item for consumption, the device comprising:
    an inner surface defining a liquid holding volume;
    an outer surface, the outer surface and inner surface forming an orifice of the liquid holding volume;
    a heating element configured on the inner surface at a floor, the heating element extending from the floor of the inner shell into the liquid holding volume;
    a thermal sensor configured to sense a temperature of the liquid holding volume;
    a mixer device, the mixer device comprising a mixing element disposed within the liquid holding volume;
    a liquid volume sensor configured at the floor on a side of the floor opposite the inner surface in a compartment within the container, wherein the liquid volume sensor is suspended in the compartment against the side of the floor opposite the inner surface; and
    a processor, the processor coupled to a memory, the thermal sensor, the heating element, the liquid volume sensor, and a power source, the processor configured to execute instructions stored in the memory, the instructions comprising:
        receiving an instruction to prepare a liquid food item within the liquid holding volume;
        in response to receiving the instruction to prepare the liquid food item within the liquid holding volume, preparing the liquid food item for consumption, wherein preparing the liquid food item for consumption comprises:
  determining, based at least in part on data provided by the liquid volume sensor, a volume of liquid food item in the liquid holding volume;
  calculating, based at least in part on the determined volume, a mixer signal for powering the mixer device,
  powering, with the power source, the mixer device by the mixer signal, wherein powering the mixer device comprises engaging the mixing element thereby causing the mixing element to rotate within the liquid holding volume;
  measuring, using the thermal sensor, a first temperature of the liquid food item within the liquid holding volume;
  determining whether the first temperature is at a consumption temperature;
  in response to determining that the first temperature is not at the consumption temperature:
    powering, with the power source, the heating element;
    measuring, using the thermal sensor, a second temperature of the liquid food item within the liquid holding volume;
    determining whether the second temperature of the liquid food item is at the consumption temperature; and
    in response to determining that the second temperature of the liquid food item is at the consumption temperature, discontinuing preparing the liquid food item for consumption.

2. The device of claim 1, wherein:
the inner surface defining the liquid holding volume is an inner surface of an inner shell, wherein the inner shell includes an inner shell outer surface opposite the inner surface of the inner shell; and
the outer surface is an outer surface of an outer shell, the outer shell comprising an outer shell inner surface opposite the outer surface of the outer shell, the outer shell being sleeved over the inner shell and defining an insulation compartment between the inner shell outer surface and the outer shell inner surface.

3. The device of claim 2, wherein the insulation compartment comprises a vacuum chamber.

4. The device of claim 1, further comprising an orientation sensor configured on the device and coupled to the processor, the orientation sensor configured to sense an orientation of the device, wherein the instructions further comprise:
  sensing, using the orientation sensor, an orientation of the device;
  determining whether the orientation of the container is an acceptable orientation for the device for preparation of a liquid food item, and
  in response to determining that the orientation is not an acceptable orientation for the device for preparation of a liquid food item, discontinuing preparation of the liquid food item.

5. The device of claim 1, further comprising a cap sensor adjacent to the orifice of the liquid holding volume, the cap sensor configured to sense the presence of a cap covering the orifice, wherein the instructions further comprise:
  determining, using the cap sensor, whether a cap is covering the orifice;
  in response to determining that no cap is covering the orifice, discontinuing preparation of the liquid food item.

6. The device of claim 1, further comprising a cap sensor adjacent to the orifice of the liquid holding volume, the cap sensor configured to sense a cap covering the orifice, wherein the instructions further comprise:
  determining, using the cap sensor, an identifier associated with a cap covering the orifice;
  determining whether the identifier associated with the cap is associated with preparation of a liquid food item; and
  in response to determining that the cap is not associated with preparation of a liquid food item, discontinuing preparation of the liquid food item.

7. The device of claim 1, wherein the mixer device comprises a stirrer magnetically coupled to a motor of the mixer device, and wherein powering the mixer device comprises powering the motor.

8. The container of claim 1, wherein preparing the liquid food item for consumption comprises:
  determining whether the volume of liquid food item in the liquid holding volume is less than a minimum volume; and
  in response to determining that the volume of liquid food item is less than the minimum volume, discontinuing preparing the liquid food item for consumption.

9. The device of claim 1,
wherein the mixing signal comprises a pulse width modulated (PWM) signal, and
wherein calculating, based at least in part on the determined volume, the mixing signal for powering the mixer device comprises calculating a duty cycle for the PWM signal based at least in part on the determined volume.

10. A container comprising:
an inner shell having an inner surface defining a liquid holding volume and an outer surface opposite of the inner surface;
an outer shell having inner and outer surfaces, the outer shell being sleeved over the inner shell and defining an insulation compartment comprising a vacuum chamber between the inner surface of the outer shell and the outer surface of the inner shell, and the outer shell and the inner shell forming an orifice to the liquid holding volume at their juncture;
a heating element configured on the inner surface of the inner shell at a floor of the inner shell, the heating element extending from the floor of the inner shell into the liquid holding volume;
a thermal sensor configured to measure a temperature of a liquid in the liquid holding volume;
a volume sensor configured on the outer surface of the inner shell at the floor, within the insulation compartment comprising the vacuum chamber; and
a processor coupled to a memory, the thermal sensor, the heating element, the volume sensor, and a power source, the processor configured to execute instructions stored in the memory, the instructions comprising:
  receiving an instruction to prepare a liquid,
  measuring, using the volume sensor, a volume of the liquid in the liquid holding volume;
  determining whether the volume is less than a minimum volume;
  in response to determining that the volume is not less than the minimum volume:
    preparing the liquid, wherein preparing the liquid comprises:

measuring, using the thermal sensor, a first temperature of a liquid in the liquid holding volume;
determining whether the first temperature is greater than or equal to a consumption temperature;
in response to determining that the first temperature is not greater than or equal to the consumption temperature:
powering the heating element;
measuring, using the thermal sensor, a second temperature of the liquid;
determining whether the second temperature of the liquid is greater than or equal to the consumption temperature;
in response to determining that the second temperature of the liquid is greater than or equal to the consumption temperature:
discontinuing preparation of the liquid, wherein discontinuing preparation of the liquid comprises refraining from powering the heating element.

11. The container of claim 10, further comprising a cap sensor coupled to the processor, the cap sensor configured to detect a presence of a cap on the orifice, wherein the memory contains further instructions executable by the processor including:
determining, using the cap sensor, whether a cap is present on the orifice; and
in response to determining that the cap is not present on the orifice, discontinuing preparation of the liquid.

12. The container of claim 10, further comprising a mixer element configured on the inner surface of the inner shell and magnetically coupled to a motor, the motor coupled to the processor and configured to cause the mixer element to rotate when a mixing signal is applied to the motor, wherein the memory contains further instructions executable by the processor including:
powering the motor with a mixing signal, thereby causing the mixer element to rotate.

13. The container of claim 10, further comprising:
a mixer element configured on the inner surface of the inner shell and magnetically coupled to a motor, the motor coupled to the processor and configured to cause the mixer element to rotate when a mixing signal is applied to the motor,
wherein the memory contains further instructions executable by the processor including:
measuring, using the volume sensor, a volume of the liquid in the liquid holding volume;
determining a mixing signal based at least in part on the measured volume; and
powering the motor with the mixing signal.

14. The container of claim 10, further comprising an orientation sensor, the orientation sensor coupled to the processor, wherein the memory contains further instructions executable by the processor including:
determining, using the orientation sensor, an orientation of the container; and
in response to determining that the orientation is not within a predetermined buffer range from upright, discontinuing preparation of the liquid.

15. The container of claim 10, further comprising a mixing element configured on the inner surface of the inner shell and magnetically coupled to a motor, the motor coupled to the processor and configured to cause the mixing element to rotate when a mixing signal is applied to the motor, wherein the motor comprises a mixing plate configured to rotate, wherein the mixing plate comprises at least one magnet, wherein the memory contains further instructions executable by the processor including:
powering the motor with a mixing signal, wherein powering the motor with the mixing signal causes the mixing plate to rotate, wherein the rotation of the mixing plate causes the mixing element to rotate.

16. The container of claim 10, further comprising a cap sensor coupled to the processor, the cap sensor configured to detect an identifier associated with a cap covering the orifice, wherein the memory contains further instructions executable by the processor including:
receiving, using the cap sensor, the identifier associated with the cap when the cap covers the orifice;
comparing the received identifier to a predefined identifier associated with a predefined type of cap; and
discontinuing preparation of the liquid if the received identifier is not equivalent to the predefined identifier.

17. A container for maintaining liquid at a storage temperature and heating the liquid to a consumption temperature, the container comprising:
an inner shell having an inner surface defining a liquid holding volume and an outer surface opposite of the inner surface, wherein the inner shell comprises a floor;
an outer shell having inner and outer surfaces, the outer shell being sleeved over the inner shell and defining an insulation compartment between the outer shell and the inner shell,
wherein the outer shell and inner shell are configured to meet at a junction defining an orifice of the liquid holding volume;
a battery coupled to a heating element;
a thermal sensor configured on the inner shell, the thermal sensor configured to measure a temperature;
a volume sensor configured on the floor of the inner shell on the outer surface of the inner shell within the insulation compartment, the volume sensor configured to measure a volume of liquid in the liquid holding volume;
a cap sensor configured to detect a presence of a cap at the orifice of the liquid holding volume;
an orientation sensor configured on the container, the orientation sensor configured to generate orientation data associated with an orientation of the container;
the heating element configured on the inner surface of the floor of the inner shell, the heating element extending from the floor of the inner shell into the liquid holding volume; and
a processor coupled to a memory, the processor coupled to the battery, the thermal sensor, the volume sensor, the cap sensor, the orientation sensor, and the heating element.

18. The container of claim 17, wherein the processor is configured to execute instructions stored in the memory, the instructions comprising:
measuring the temperature of a liquid in the liquid holding volume by the thermal sensor;
measuring a volume of the liquid in the liquid holding volume by the volume sensor;
detecting a presence and a type of cap covering the orifice of the liquid holding volume;
determining an orientation of the container based at least in part on the orientation data generated by the orientation sensor;

preparing the liquid in the liquid holding volume, wherein preparing the liquid comprises powering the heating element.

19. The container of claim 17, further comprising a mixer device, the mixer device comprising a mixer motor coupled to a mixing element configured to rotate in the liquid holding volume, wherein the processor is configured to execute instructions stored in the memory, the instructions comprising:

receiving an instruction to prepare a liquid in the liquid holding volume;

measuring, using the volume sensor, a volume of the liquid;

calculating, based at least in part on the measured volume of the liquid, a mixing signal for powering the mixer motor;

powering the mixer motor using the mixing signal.

20. The container of claim 18, wherein the instructions further comprise:

while preparing the liquid in the liquid holding volume, determining a current orientation of the container based at least in part on the orientation data generated by the orientation sensor;

determining whether the current orientation of the container is an acceptable orientation for the container for preparation of a liquid food item, and in response to determining that the current orientation is not an acceptable orientation for the container for preparation of a liquid food item, discontinuing preparation of the liquid food item.

21. The container of claim 10, wherein the heating element comprises at least one flow window.

22. The container of claim 10, wherein:

the heating element comprises a first resistive panel and a second resistive panel, the first and second resistive panels extend from the floor into the liquid holding volume, and the first and second resistive panels are separated by a flow window.

* * * * *